US010575244B1

(12) United States Patent
Gustafson et al.

(10) Patent No.: US 10,575,244 B1
(45) Date of Patent: Feb. 25, 2020

(54) METHOD AND SYSTEM FOR IMPLEMENTING CONSUMER WIFI SHARING

(71) Applicant: CenturyLink Intellectual Property LLC, Broomfield, CO (US)

(72) Inventors: Pamela K. Gustafson, Overland Park, KS (US); Thomas Charles Barnett, Jr., Monroe, LA (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 0 days.

(21) Appl. No.: 16/194,037

(22) Filed: Nov. 16, 2018

Related U.S. Application Data

(60) Provisional application No. 62/732,920, filed on Sep. 18, 2018.

(51) Int. Cl.
| | |
|---|---|
| *H04W 48/16* | (2009.01) |
| *H04W 48/14* | (2009.01) |
| *H04W 64/00* | (2009.01) |
| *H04W 48/20* | (2009.01) |
| *H04W 4/24* | (2018.01) |
| *H04M 15/00* | (2006.01) |
| *H04W 84/04* | (2009.01) |

(52) U.S. Cl.
CPC ........... *H04W 48/16* (2013.01); *H04M 15/51* (2013.01); *H04W 4/24* (2013.01); *H04W 48/14* (2013.01); *H04W 48/20* (2013.01); *H04W 64/00* (2013.01); *H04W 64/003* (2013.01); *H04W 84/045* (2013.01)

(58) Field of Classification Search
CPC .. H01J 49/0009; H01J 49/0027; H01J 49/145; H01J 49/168; H01J 49/286; H01J 49/426; H04W 48/16; H04W 4/24; H04W 48/14; H04W 48/20; H04W 64/00; H04W 64/003; H04W 84/045; H04M 15/51
See application file for complete search history.

(56) References Cited

U.S. PATENT DOCUMENTS

| | | | |
|---|---|---|---|
| 7,123,586 B1 * | 10/2006 | Cook | H04L 12/2856 370/237 |
| 7,548,976 B2 * | 6/2009 | Bahl | G06Q 20/3674 709/226 |
| 8,695,079 B1 * | 4/2014 | Miller | H04L 63/08 709/223 |
| 10,341,917 B2 * | 7/2019 | Vare | H04W 36/24 |

(Continued)

*Primary Examiner* — Kashif Siddiqui

(57) ABSTRACT

Novel tools and techniques are provided for implementing wireless communications, and, more particularly, to methods, systems, and apparatuses for implementing consumer WiFi sharing. In various embodiments, a computing system might receive, from a user device of an end user, a request to access at least one wireless access point that is available for wireless communication sharing; might determine a location of the user device and a location of each wireless access point ("WAP") among a compiled list of WAPs; might identify at least one WAP among the WAPs that are within wireless communication range of the user device, based at least in part on the determined location of the user device and the location of each of the WAPs, and that are available for sharing, based on the compiled list of WAPs; and might provide the user device with access to the identified at least one WAP.

19 Claims, 12 Drawing Sheets

(56) References Cited

U.S. PATENT DOCUMENTS

2004/0051664 A1* 3/2004 Frank .................... G01S 5/0252
                                                              342/457
2014/0282754 A1* 9/2014 Rehman ................. H04N 21/61
                                                               725/81
2019/0141624 A1* 5/2019 Wong .................... H04W 76/10

* cited by examiner

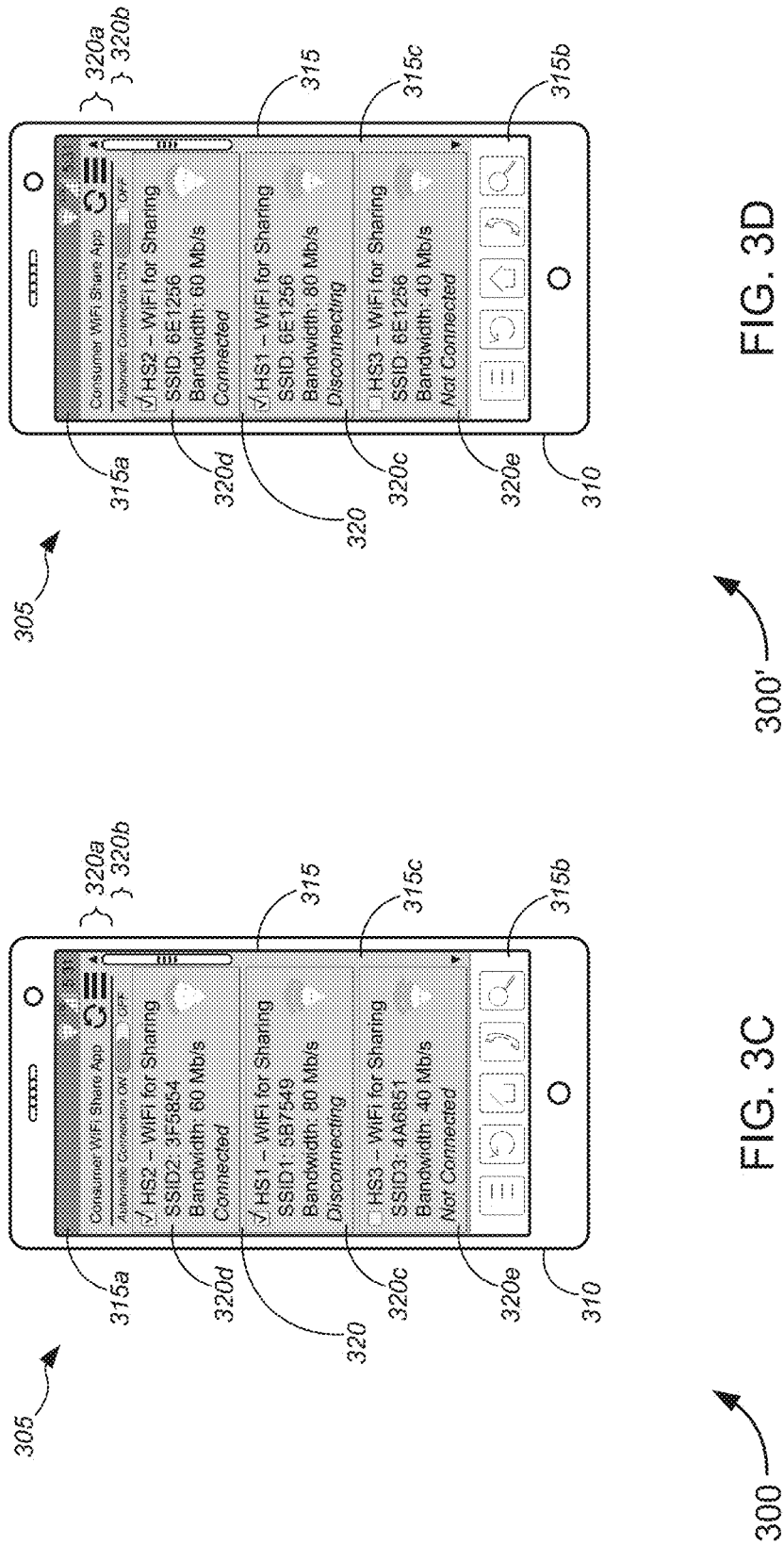

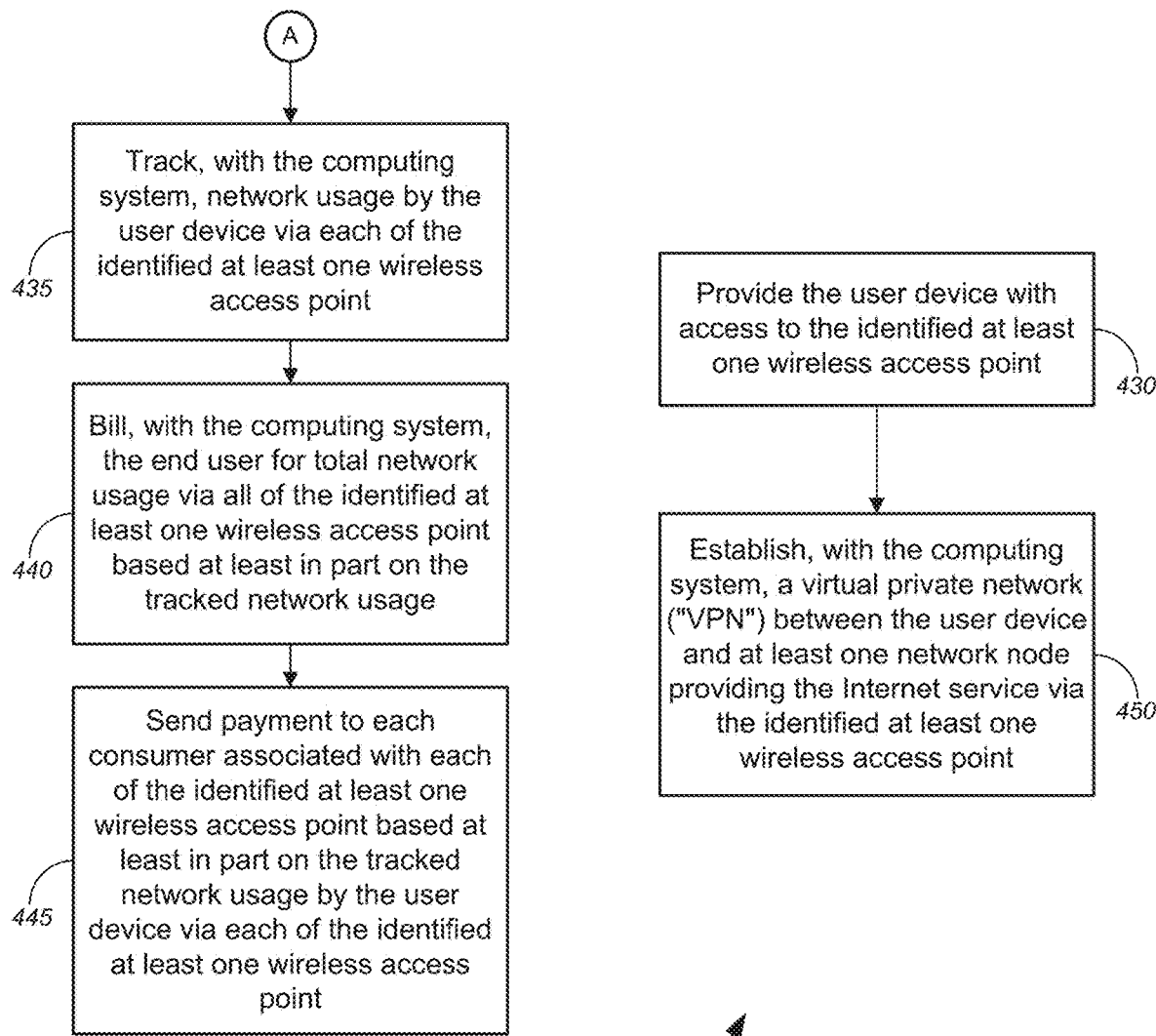

METHOD AND SYSTEM FOR IMPLEMENTING CONSUMER WIFI SHARING

CROSS-REFERENCES TO RELATED APPLICATIONS

This application claims priority to U.S. Patent Application Ser. No. 62/732,920 (the "'920 application"), filed Sep. 18, 2018 by Pamela K. Gustafson et al., entitled, "Method and System for Implementing Consumer WiFi Sharing," which is incorporated herein by reference in its entirety for all purposes.

This application may also be related to U.S. Patent Application Ser. No. 62/752,230 (the "'230 application"), filed Oct. 29, 2018 by Kevin M. McBride et al., entitled, "Over-The-Top Internet Service Provisioning," which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing wireless communications, and, more particularly, to methods, systems, and apparatuses for implementing consumer WiFi sharing.

BACKGROUND

Although conventional commercial WiFi hotspots (such as coffee house WiFi hotspots or the like) are currently available, providing public WiFi access to user devices within WiFi range, the inventors are presently not aware of any available consumer WiFi options that allow a regular cellular service subscriber to provide other users with consumer WiFi sharing via hotspots through the subscriber's user device, much less receive compensation from such other users for use of the shared WiFi, while providing the subscriber with customizable control over WiFi sharing via the subscriber's user device.

Similarly, although conventional residential or business gateways (located at customer premises) are currently available, providing secure private WiFi access or unsecure public WiFi access to user devices within WiFi range, the inventors are presently not aware of any available consumer WiFi options that allow a network service subscriber to provide other users with WiFi sharing through the subscribers residential or business gateways in a controlled and customizable manner via the subscriber's user device, much less receive compensation from such other users for use of the shared WiFi.

Hence, there is a need for more robust and scalable solutions for implementing wireless communications, and, more particularly, to methods, systems, and apparatuses for implementing consumer WiFi sharing.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3D are schematic diagrams illustrating various embodiments of another system that may be used for implementing consumer WiFi sharing.

FIGS. 4A-4D are flow diagrams illustrating a method for implementing consumer WiFi sharing, in accordance with various embodiments.

DETAILED DESCRIPTION OF CERTAIN EMBODIMENTS

Overview

Figure 1:
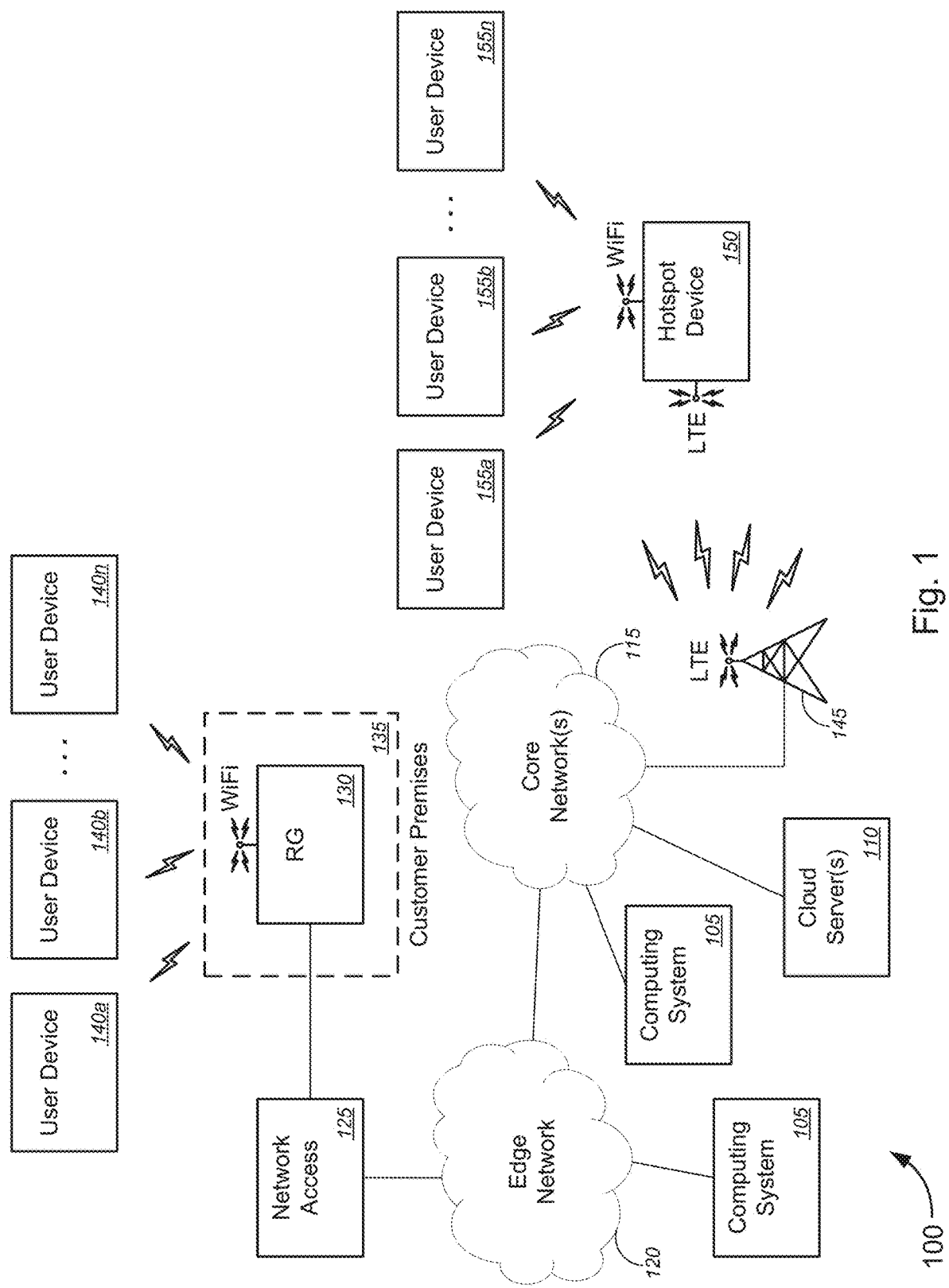
FIG. 1 is a schematic diagram illustrating a system for implementing consumer WiFi sharing, in accordance with various embodiments.

Various embodiments provide tools and techniques for implementing wireless communications, and, more particularly, to methods, systems, and apparatuses for implementing consumer WiFi sharing.

In various embodiments, a computing system might receive information regarding consumer wireless communication share status for each of a plurality of consumers receiving Internet service through one or more service providers; might compile a list of wireless access points associated with the plurality of consumers together with corresponding consumer wireless communication share statuses and bandwidths available for sharing, based on the received information; might receive, from a user device of an end user, a request to access at least one wireless access point that is available for wireless communication sharing; might determine a location of the user device and a location of each of one or more wireless access points among the compiled list of wireless access points; might identify at least one wireless access point among the one or more wireless access points that are within wireless communication range of the user device, based at least in part on the determined location of the user device and the location of each of the one or more wireless access points, and that are available for sharing, based on the compiled list of wireless access points; and might provide the user device with access to the identified at least one wireless access point.

Unlike conventional commercial WiFi hotspots (such as coffee house WiFi hotspots or the like) that are currently available, providing public WiFi access to user devices within WiFi range, the various embodiments allow a regular cellular service subscriber to provide other users with consumer WiFi sharing via hotspots through the subscriber's user device, and receive compensation from such other users for use of the shared WiFi, while providing the subscriber with customizable control over WiFi sharing via the subscriber's user device.

Similarly, unlike conventional residential or business gateways (located at customer premises) that are currently available, providing secure private WiFi access or unsecure public WiFi access to user devices within WiFi range, the various embodiments allow a network service subscriber to provide other users with WiFi sharing through the subscribers residential or business gateways in a controlled and customizable manner via the subscriber's user device, and to receive compensation from such other users for use of the shared WiFi.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, wireless communications, and/or the like. In other aspects, certain embodiments, can improve the functioning of user equipment or systems themselves (e.g., wireless communications systems, gateway devices, hotspot devices, etc.), for example, by receiving, with a computing system, information regarding consumer wireless communication share status for each of a plurality of consumers receiving Internet service through one or more service providers; compiling, with the computing system, a list of wireless access points associated with the plurality of consumers together with corresponding consumer wireless communication share statuses and bandwidths available for sharing, based on the received information; receiving, with the computing system and from a user device of an end user, a request to access at least one wireless access point that is available for wireless communication sharing; determining, with the computing system, a location of the user device and a location of each of one or more wireless access points among the compiled list of wireless access points; identifying, with the computing system, at least one wireless access point among the one or more wireless access points that are within wireless communication range of the user device, based at least in part on the determined location of the user device and the location of each of the one or more wireless access points, and that are available for sharing, based on the compiled list of wireless access points; and providing the user device with access to the identified at least one wireless access point; and/or the like. In particular, to the extent any abstract concepts are present in the various embodiments, those concepts can be implemented as described herein by devices, software, systems, and methods that involve specific novel functionality (e.g., steps or operations), such as, enabling a consumer to provide WiFi sharing with devices of other users via the consumer's user device hotspot functionality (e.g., smart phone, tablet computer, portable WiFi hotspot device, etc.) and/or via the consumer's home or business wireless access point device (e.g., residential gateway device, business gateway device, virtual gateway device, network access point, wireless access point device, etc.), while providing the consumer with customizable control over the WiFi sharing via an app or web portal, or the like, while also enabling tracking of the WiFi use by the other users for accurate billing of such users' WiFi use while reimbursing the consumer for the shared use, and/or the like, which provides additional functionality to wireless communications and enabling customized control to consumers, and/or the like, to name a few examples, that extend beyond mere conventional computer processing operations. These functionalities can produce tangible results outside of the implementing computer system, including, merely by way of example, enhanced wireless communications control provided to consumers of wireless communications service to enable sharing of the consumers' wireless communications service with other users and their devices, and/or the like, at least some of which may be observed or measured by customers and/or service providers.

In an aspect, a method might comprise receiving, with a computing system, information regarding consumer wireless communication share status for each of a plurality of consumers receiving Internet service through one or more service providers; compiling, with the computing system, a list of wireless access points associated with the plurality of consumers together with corresponding consumer wireless communication share statuses and bandwidths available for sharing, based on the received information; and receiving, with the computing system and from a user device of an end user, a request to access at least one wireless access point that is available for wireless communication sharing. The method might further comprise determining, with the computing system, a location of the user device and a location of each of one or more wireless access points among the compiled list of wireless access points; identifying, with the computing system, at least one wireless access point among the one or more wireless access points that are within wireless communication range of the user device, based at least in part on the determined location of the user device and the location of each of the one or more wireless access points, and that are available for sharing, based on the compiled list of wireless access points; and providing the user device with access to the identified at least one wireless access point.

In some embodiments, the identified at least one wireless access point might each comprise one of a residential gateway device, a business gateway device, a virtual gateway device, a network access point ("NAP"), a wireless access point ("WAP") device, a smart phone, a tablet computer, or a portable WiFi hotspot device, and/or the like. In some cases, the user device might comprise one of a laptop computer, a tablet computer, a handheld computer, a smart phone, a mobile telephone, a personal digital assistant, a smart watch, or a portable gaming device, and/or the like.

According to some embodiments, the method might further comprise tracking, with the computing system, network usage by the user device via each of the identified at least one wireless access point; billing, with the computing system, the end user for total network usage via all of the identified at least one wireless access point based at least in part on the tracked network usage; and sending payment to each consumer associated with each of the identified at least one wireless access point based at least in part on the tracked network usage by the user device via each of the identified at least one wireless access point. In some instances, billing the end user might comprise charging the end user at rates that are based on location and density of available wireless communication coverage.

In some embodiments, the user device might be moved relative to the location of each of the identified at least one wireless access point from proximity to a first wireless access point among the identified at least one wireless access point to proximity to a second wireless access point among the identified at least one wireless access point. In some cases, providing the user device with access to the identified at least one wireless access point might comprise providing the user device with access to the first wireless access point, and while the user device is moved closer to the second wireless access point, providing the user device with access to the second wireless access point while removing access to the first wireless access point. In some instances, each of at least one of the first wireless access point or second wireless access point might be a stationary wireless access point. Alternatively, each of at least one of the first wireless access point or second wireless access point might be a cellular WiFi hotspot device.

According to some embodiments, the first wireless access point might comprise a corresponding first unique service set identifier ("SSID"), while the second wireless access point might comprise a corresponding second unique SSID. The method might further comprise establishing a common proxy SSID for each of the first wireless access point and the second wireless access point to replace the first unique SSID and the second unique SSID when the identified at least one wireless access point is visible to the user device in response to a scan of available wireless access points. Providing the user device with access to the first wireless access point might comprise establishing a connection between the user device and the first wireless access point using the first unique SSID without the first unique SSID being visible to the user device. Providing the user device with access to the second wireless access point might comprise establishing a connection between the user device and the second wireless access point using the second unique SSID without the second unique SSID being visible to the user device.

In some embodiments, providing the user device with access to the identified at least one wireless access point might comprise establishing, with the computing system, a virtual private network ("VPN") between the user device and at least one network node providing the Internet service via the identified at least one wireless access point.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive information regarding consumer wireless communication share status for each of a plurality of consumers receiving Internet service through one or more service providers; compile a list of wireless access points associated with the plurality of consumers together with corresponding consumer wireless communication share statuses and bandwidths available for sharing, based on the received information; receive, from a user device of an end user, a request to access at least one wireless access point that is available for wireless communication sharing; determine a location of the user device and a location of each of one or more wireless access points among the compiled list of wireless access points; identify at least one wireless access point among the one or more wireless access points that are within wireless communication range of the user device, based at least in part on the determined location of the user device and the location of each of the one or more wireless access points, and that are available for sharing, based on the compiled list of wireless access points; and provide the user device with access to the identified at least one wireless access point.

In some embodiments, the identified at least one wireless access point might each comprise one of a residential gateway device, a business gateway device, a virtual gateway device, a network access point ("NAP"), a wireless access point ("WAP") device, a smart phone, a tablet computer, or a portable WiFi hotspot device, and/or the like. In some cases, the user device might comprise one of a laptop computer, a tablet computer, a handheld computer, a smart phone, a mobile telephone, a personal digital assistant, a smart watch, or a portable gaming device, and/or the like.

According to some embodiments, the set of instructions, when executed by the at least one processor, further causes the apparatus to: track network usage by the user device via each of the identified at least one wireless access point; bill the end user for total network usage via all of the identified at least one wireless access point based at least in part on the tracked network usage; and send payment to each consumer associated with each of the identified at least one wireless access point based at least in part on the tracked network usage by the user device via each of the identified at least one wireless access point. In some instances, billing the end user might comprise charging the end user at rates that are based on location and density of available wireless communication coverage.

In some embodiments, the user device might be moved relative to the location of each of the identified at least one wireless access point from proximity to a first wireless access point among the identified at least one wireless access point to proximity to a second wireless access point among the identified at least one wireless access point. In some cases, providing the user device with access to the identified at least one wireless access point might comprise providing the user device with access to the first wireless access point, and while the user device is moved closer to the second wireless access point, providing the user device with access to the second wireless access point while removing access to the first wireless access point. In some instances, each of at least one of the first wireless access point or second wireless access point might be a stationary wireless access point. Alternatively, each of at least one of the first wireless access point or second wireless access point might be a cellular WiFi hotspot device.

According to some embodiments, the first wireless access point might comprise a corresponding first unique service set identifier ("SSID"), while the second wireless access point might comprise a corresponding second unique SSID. The set of instructions, when executed by the at least one processor, further causes the apparatus to: establish a common proxy SSID for each of the first wireless access point and the second wireless access point to replace the first unique SSID and the second unique SSID when the identified at least one wireless access point is visible to the user device in response to a scan of available wireless access points. Providing the user device with access to the first wireless access point might comprise establishing a connection between the user device and the first wireless access point using the first unique SSID without the first unique SSID being visible to the user device. Providing the user device with access to the second wireless access point might comprise establishing a connection between the user device and the second wireless access point using the second unique SSID without the second unique SSID being visible to the user device.

In some embodiments, providing the user device with access to the identified at least one wireless access point might comprise establishing a virtual private network ("VPN") between the user device and at least one network node providing the Internet service via the identified at least one wireless access point.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive information regarding consumer wireless communication share status for each of a plurality of consumers receiving Internet service through one or more service providers; compile a list of wireless access points associated with the plurality of consumers together with corresponding consumer wireless communication share statuses and bandwidths available for sharing, based on the received information; receive, from a user device of an end user, a request to access at least one wireless access point that is available for wireless communication sharing; determine a location of the user device and a location of each of one or more wireless access points among the compiled list of wireless access points; identify at least one wireless access point among the one or more wireless access points that are within wireless communication range of the user device, based at least in part on the determined location of the user device and the location of each of the one or more wireless access points, and that are available for sharing, based on the compiled list of wireless access points; and provide the user device with access to the identified at least one wireless access point.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing wireless communications, and, more particularly, to methods, systems, and apparatuses for implementing consumer WiFi sharing, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing consumer WiFi sharing, in accordance with various embodiments.

In the non-limiting embodiment of FIG. 1, system 100 might comprise one or more computing systems 105, a cloud server(s) 110, one or more core networks 115, an edge network 120, network access servers or nodes 125, and/or the like. In some cases, the one or more computing systems 105 might be communicatively coupled to (and/or located within) at least one of the one or more core networks 115 or the edge network 120. In some instances, the cloud server(s) 110 might be communicatively coupled to (and/or located within) the one or more core networks 115.

In some embodiments, system 100 might comprise a residential gateway ("RG") device 130, which might be located within customer premises 135. In some cases, the RG device 130 might alternatively be embodied as another wireless access point, which might include, without limitation, one of a business gateway ("BG") device, a virtual gateway ("vG") device, a network access point ("NAP"), a wireless access point ("WAP") device, or the like. System 100 might further comprise one or more user devices 140a-140n (collectively, "user devices 140" or the like), each of which might include, but is not limited to, one of a laptop computer, a tablet computer, a handheld computer, a smart phone, a mobile telephone, a personal digital assistant, a smart watch, or a portable gaming device, and/or the like. Alternatively, or additionally, system 100 might comprise one or more telecommunications relay systems 145 (which might include, without limitation, one or more wireless network interfaces (e.g., wireless modems, wireless access points, and the like), one or more towers, one or more satellites, and/or the like). In various embodiments, the one or more telecommunications relay systems 145 might comprise cellular communications relay systems that might receive and/or transmit one or more of 3G wireless signals (not shown), 4G wireless signals (not shown), 4G LTE wireless signals (as depicted in FIG. 1), 5G wireless signals (not shown), and/or the like. System 100 might further comprise a hotspot device 150 and one or more user devices 155a-155n (collectively, "user devices 155" or the like), each of which might include, but is not limited to, one of a laptop computer, a tablet computer, a handheld computer, a smart phone, a mobile telephone, a personal digital assistant, a smart watch, or a portable gaming device, and/or the like. As shown in FIG. 1, wireless communications are depicted by lightning bolt symbols, with cellular communications being denoted by "LTE" (although not limited to 4G LTE wireless communications) and with WiFi communications being denoted by "WiFi" (although not limited to WiFi, but may include, without limitation, Bluetooth™ communications, Zigbee™ communications, Z-Wave™ communications, and/or the like).

In operation, the computing system 105 or the cloud server(s) 110 might receive information regarding consumer wireless communication share status for each of a plurality of consumers receiving Internet service through one or more service providers; might compile a list of wireless access points 130 and/or 150 associated with the plurality of consumers together with corresponding consumer wireless communication share statuses and bandwidths available for sharing, based on the received information; might receive, from a user device 140 or 155 of an end user, a request to access at least one wireless access point 130 or 150 that is available for wireless communication sharing; might determine a location of the user device 140 or 155 and a location of each of one or more wireless access points 130 or 150 among the compiled list of wireless access points 130 and/or 150; might identify at least one wireless access point 130 or 150 among the one or more wireless access points 130 and/or 150 that are within wireless communication range of the user device 140 or 155, based at least in part on the determined location of the user device 140 or 155 and the location of each of the one or more wireless access points 130 or 150, and that are available for sharing, based on the compiled list of wireless access points 130 and/or 150; and might provide the user device 140 or 155 with access to the identified at least one wireless access point 130 or 150.

In some embodiments, the computing system 105 or the cloud server(s) 110 might track network usage by the user device 140 or 155 via each of the identified at least one wireless access point 130 or 150; bill the end user for total network usage via all of the identified at least one wireless access point 130 or 150 based at least in part on the tracked network usage; and send payment to each consumer associated with each of the identified at least one wireless access point 130 or 150 based at least in part on the tracked network usage by the user device 140 or 155 via each of the identified at least one wireless access point 130 or 150. In some cases, billing the end user might comprise charging the end user at rates that are based on location and density of available wireless communication coverage.

According to some embodiments, the user device 140 or 155 might be moved relative to the location of each of the identified at least one wireless access point 130 or 150 from proximity to a first wireless access point 130 or 150 among the identified at least one wireless access point 130 or 150 to proximity to a second wireless access point 130 or 150 among the identified at least one wireless access point 130 or 150. In some cases, providing the user device 140 or 155 with access to the identified at least one wireless access point 130 or 150 might comprise providing the user device 140 or 155 with access to the first wireless access point 130 or 150, and while the user device 140 or 155 is moved closer to the second wireless access point 130 or 150, providing the user device 140 or 155 with access to the second wireless access point 130 or 150 while removing access to the first wireless access point 130 or 150. In some embodiments, each of at least one of the first wireless access point 130 or 150 or second wireless access point 130 or 150 might be a stationary wireless access point 130. Alternatively, each of at least one of the first wireless access point 130 or 150 or second wireless access point 130 or 150 might be a cellular WiFi hotspot device 150. Alternatively, one of the first wireless access point 130 or 150 or the second wireless access point 130 or 150 might be a stationary wireless access point 130 while the other of the first wireless access point 130 or 150 or the second wireless access point 130 or 150 might be a cellular WiFi hotspot device 150.

In some cases, the first wireless access point 130 or 150 might comprise a corresponding first unique service set identifier ("SSID"), while the second wireless access point 130 or 150 might comprise a corresponding second unique SSID. A common proxy SSID might be established for each of the first wireless access point 130 or 150 and the second wireless access point 130 or 150 to replace the first unique SSID and the second unique SSID when the identified at least one wireless access point 130 or 150 is visible to the user device 140 or 155 in response to a scan of available wireless access points 130 or 150. In some instances, providing the user device 140 or 155 with access to the first wireless access point 130 or 150 might comprise establishing a connection between the user device 140 or 155 and the first wireless access point 130 or 150 using the first unique SSID without the first unique SSID being visible to the user device 140 or 155. Alternatively, or additionally, providing the user device 140 or 155 with access to the second wireless access point 130 or 150 might comprise establishing a connection between the user device 140 or 155 and the second wireless access point 130 or 150 using the second unique SSID without the second unique SSID being visible to the user device 140 or 155.

In some embodiments, providing the user device 140 or 155 with access to the identified at least one wireless access point 130 and/or 150 might comprise establishing a virtual private network ("VPN") between the user device 140 or 155 and at least one network node providing the Internet service via the identified at least one wireless access point 130 or 150. According to some embodiments, a walled garden or the like might be used to limit access to the wireless network communication by the user devices 140 or 155, in terms of content, websites, usage time, etc.

In some aspects, the system and method might allow consumers to participate in the ever-growing WiFi sharing consortium or marketplace globally. In some cases, the system and method might allow consumers to share their personal WiFi with others in the area via a secure VPN approach and including all wired and wireless technologies globally and including cellular "MyFi" hotspots. The system and method might allow consumers to share their WiFi similar to bike share, car share, house share, boat share, RV share, and/or the like. In some instances, the system and method might provide security via an application and a VPN. The system and method might provide the ability to monetize via the marketplace and allow for unused WiFi service to generate additional revenue to consumers while they are aware or during non-busy hours as set by the consumer, might provide the ability to charge the end user via micro payments, might provide the ability to visualize via location-based services personal hotspots in the area available for use and rate per minute, might provide the ability to charge higher rates based on location and density of available cellular or WiFi coverage, might provide the ability to roam onto other WiFi hotspot marketplace offerings, and/or the like.

These and other functions of the system 100 (and its components) are described in greater detail below with respect to FIGS. 2-4.

FIGS. 2A-2D (collectively, "FIG. 2") are schematic diagrams illustrating various embodiments 200 and 200' of a system that may be used for implementing consumer WiFi sharing. FIG. 2 depicts consumer wireless network sharing in the context of customers of a network service provider designating that at least a portion of their home or business wireless network service (e.g., WiFi service, etc.) is available for sharing (and in some cases, also designating an amount of bandwidth that is made available for sharing) with users (e.g., subscribers) who are provided with access to the consumer wireless network sharing service.

Figure 2A:
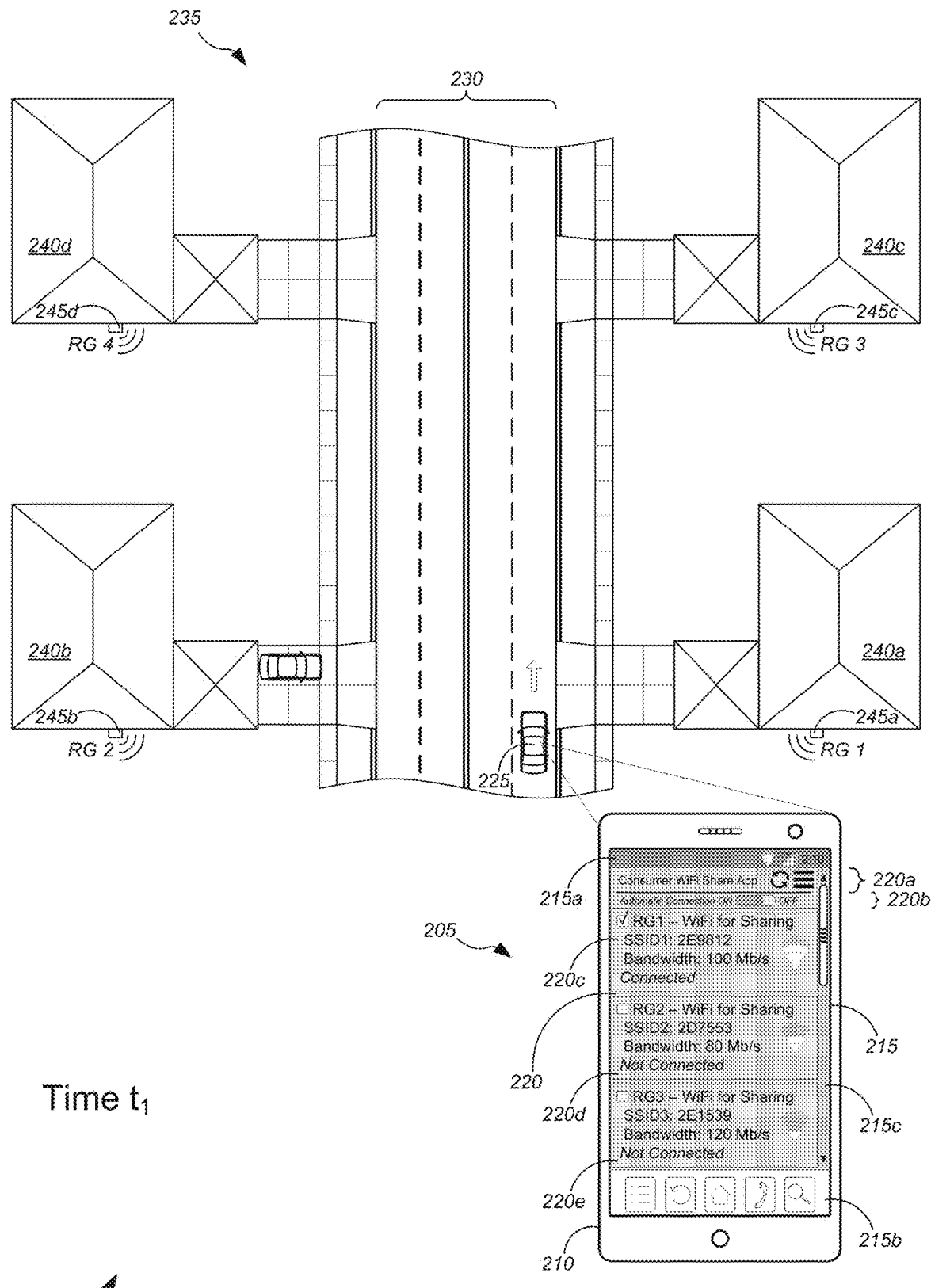
FIGS. 2A-2D are schematic diagrams illustrating various embodiments of a system that may be used for implementing consumer WiFi sharing.
Figure 2B:
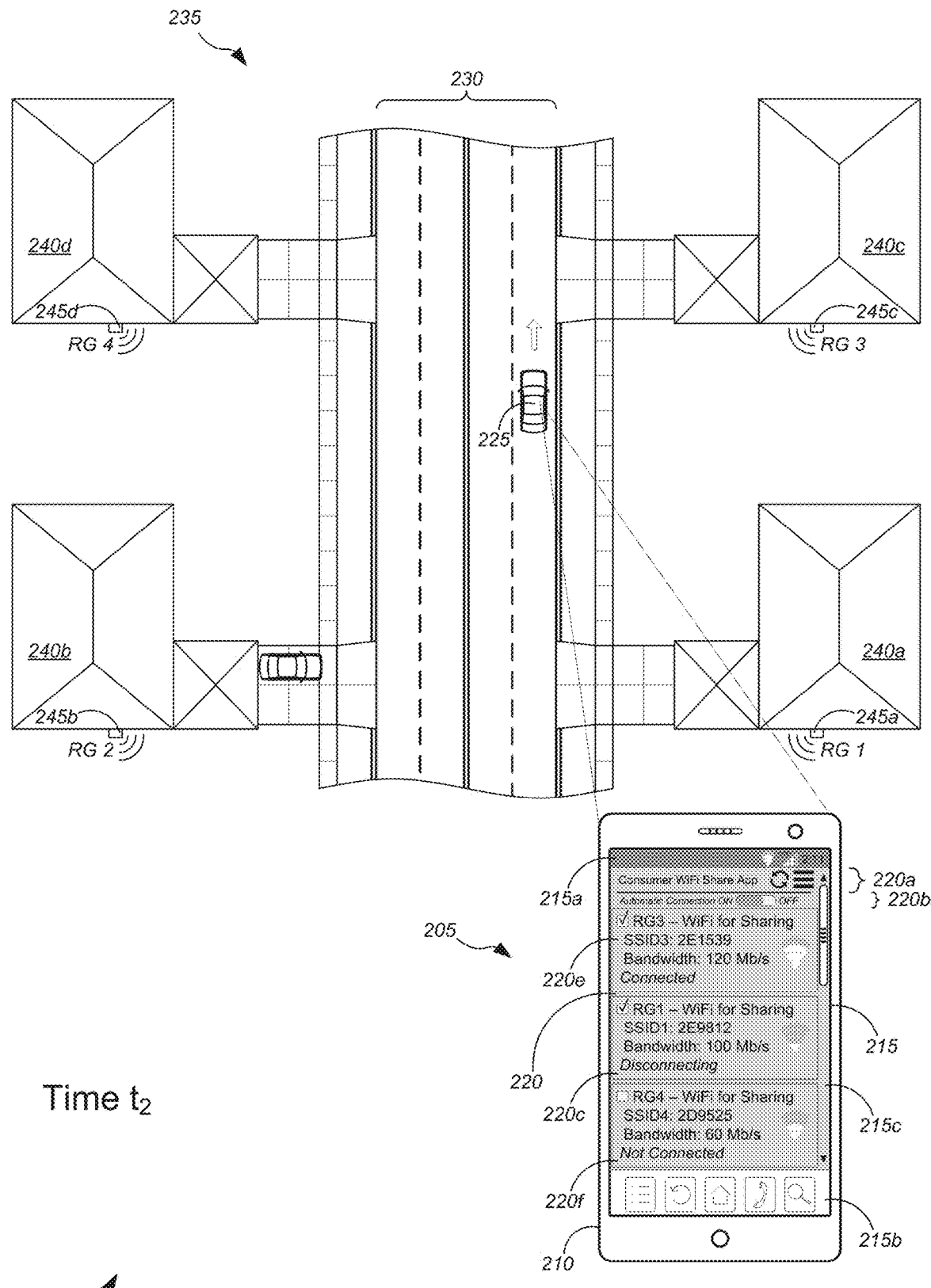

In the non-limiting embodiment 200 of FIG. 2A and FIG. 2B, a user device 205 might comprise a housing 210, a display screen 215, and a consumer WiFi share software application ("app") 220 running on the user device 205 and being displayed on the display screen 215. Alternative to the app 220, a web portal might be implemented. In the non-limiting example of FIG. 2, the display screen 215 might comprise a header portion 215a, a quick task portion 215b, and a main display portion 215c. In the header portion 215a might be displayed at least one of time of day, cellular communications signal strength icon, and/or wireless communications signal strength icon, or the like. In the quick task portion 215b might be displayed at least one of a main menu button, a back or undo button, a home button, a call button, a search button, and/or the like. In the main display portion 215c might be displayed the consumer WiFi share app 220, which might include, but is not limited to, at least one of an app header portion 220a (which might include, without limitation, at least one of an app title, a refresh button, or a menu icon, and/or the like), a connectivity option portion 220b (which might provide the user with the option to turn on or off automatic WiFi connection with available wireless access points or automatic shifting WiFi connection amongst available wireless access points, or the like), or one or more information portions 220c-220e for corresponding one or more wireless access points that are available for sharing, and/or the like. The user device 205 might be disposed within a vehicle 225 that may be travelling along a road 230 of a neighborhood or other population area 235, in which might be disposed a plurality of customer premises 240a-240d, in each of which might be disposed one of a plurality of wireless access points 245a-245d. Each of the wireless access points 245a-245d might include, without limitation, one of a residential gateway ("RG") device, a business gateway ("BG") device, a virtual gateway ("vG") device, a network access point ("NAP"), or a wireless access point ("WAP") device, and/or the like.

FIGS. 2A and 2B together depict a time lapse (i.e., from time $t_1$ to time $t_2$) in which a user (e.g., a subscriber to the consumer wireless network sharing service) having the user device 205 travels along the roadway 230 through the neighborhood 235 via the vehicle 225 (e.g., as depicted by the arrow in front of the vehicle 225).

At time $t_1$ (as shown in FIG. 2A), the user in the vehicle 225 might be on the roadway 230 closest to the first customer premises 240a (and thus closest to first wireless access point RG 1 245a that is located on the first customer premises 240a). As depicted in the main display portion 215c of the user device 205 as shown in FIG. 2A, the one or more information portions 220c-220e might include, without limitation, a first information portion 220c, a second information portion 220d, and a third information portion 220e, or the like. The first information portion 220c might include information about the first wireless access point RG 1 245a, including, but not limited to, at least one of a first unique service set identifier ("SSID") associated with the first wireless access point (in this case, "2E9812"), available bandwidth for sharing by the first wireless access point (in this case, "100 Mb/s"), a wireless communications signal strength icon denoting the signal strength of the first wireless access point as detected by the user device 205 (in this case, three of four bars of signal), a connection status between the user device 205 and the first wireless access point (in this case, the status being "connected"), or a checkbox providing the user with the option of manually connecting or disconnecting the user device 205 from the first wireless access point (in this case, since the user device 205 is connected to the first wireless access point, the checkbox is filled with a checkmark (which may be manually deselected by the user if so desired)), and/or the like.

The second information portion 220d might include information about the second wireless access point RG 2 245b, including, but not limited to, at least one of a second unique SSID associated with the second wireless access point (in this case, "2D7553"), available bandwidth for sharing by the second wireless access point (in this case, "80 Mb/s"), a wireless communications signal strength icon denoting the signal strength of the second wireless access point as detected by the user device 205 (in this case, two of four bars of signal), a connection status between the user device 205 and the second wireless access point (in this case, the status being "not connected"), or a checkbox providing the user with the option of manually connecting or disconnecting the user device 205 from the second wireless access point (in this case, since the user device 205 is not connected to the second wireless access point, the checkbox is not filled with a checkmark (which may be manually selected by the user if so desired)), and/or the like.

The third information portion 220e might include information about the third wireless access point RG 3 245c, including, but not limited to, at least one of a third unique SSID associated with the third wireless access point (in this case, "2E1539"), available bandwidth for sharing by the third wireless access point (in this case, "120 Mb/s"), a wireless communications signal strength icon denoting the signal strength of the third wireless access point as detected by the user device 205 (in this case, one of four bars of signal), a connection status between the user device 205 and the third wireless access point (in this case, the status being "not connected"), or a checkbox providing the user with the option of manually connecting or disconnecting the user device 205 from the third wireless access point (in this case, since the user device 205 is not connected to the third wireless access point, the checkbox is not filled with a checkmark (which may be manually selected by the user if so desired)), and/or the like.

At time $t_2$ (as shown in FIG. 2B), the user in the vehicle 225 might be further along on the roadway 230 away from the first customer premises 240a (and thus further away from the first wireless access point RG 1 245a that is located on the first customer premises 240a) and closest to the third customer premises 240c (and thus closest to the third wireless access point RG 3 245c that is located on the third customer premises 240c). As depicted in the main display portion 215c of the user device 205 as shown in FIG. 2B, the one or more information portions might include, without limitation, the third information portion 220e, the first information portion 220c, and a fourth information portion 220f, or the like.

The third information portion 220e might include information about the third wireless access point RG 3 245c, including, but not limited to, at least one of the third unique SSID associated with the third wireless access point (in this case, "2E1539"), available bandwidth for sharing by the third wireless access point (in this case, "120 Mb/s"), the wireless communications signal strength icon denoting the signal strength of the third wireless access point as detected by the user device 205 (in this case, three of four bars of signal), the connection status between the user device 205 and the third wireless access point (in this case, the status being "connected"), or the checkbox providing the user with the option of manually connecting or disconnecting the user device 205 from the third wireless access point (in this case, since the user device 205 is automatically connected to the third wireless access point (as a result of the automatic connection selector being set to ON by the user, and the computing system (shown in FIG. 1) automatically establishing a connection between the user device 205 and the third wireless access point 245c via the consumer WiFi Share App or the like)), and/or the like. In this case, the checkbox is filled with a checkmark (which may be manually deselected by the user if so desired)).

The first information portion 220c might include information about the first wireless access point RG 1 245a, including, but not limited to, at least one of the first unique SSID associated with the first wireless access point (in this case, "2E9812"), available bandwidth for sharing by the first wireless access point (in this case, "100 Mb/s"), the wireless communications signal strength icon denoting the signal strength of the first wireless access point as detected by the user device 205 (in this case, one of four bars of signal), the connection status between the user device 205 and the first wireless access point (in this case, the status being "disconnecting"; in this case, after connecting the user device 205 with the third wireless access point, the computing system (as shown in FIG. 1) might begin to disconnect the user device 205 from the first wireless access point), or the checkbox providing the user with the option of manually connecting or disconnecting the user device 205 from the first wireless access point (in this case, since the user device 205 is still connected to the first wireless access point, the checkbox is filled with a checkmark (which may be manually deselected by the user if so desired)), and/or the like.

The fourth information portion 220f might include information about the fourth wireless access point RG 4 245d, including, but not limited to, at least one of a fourth unique SSID associated with the fourth wireless access point (in this case, "2D9525"), available bandwidth for sharing by the fourth wireless access point (in this case, "60 Mb/s"), a wireless communications signal strength icon denoting the signal strength of the fourth wireless access point as detected by the user device 205 (in this case, two of four bars of signal), a connection status between the user device 205 and the fourth wireless access point (in this case, the status being "not connected"), or a checkbox providing the user with the option of manually connecting or disconnecting the user device 205 from the fourth wireless access point (in this case, since the user device 205 is not connected to the fourth wireless access point, the checkbox is not filled with a checkmark (which may be manually selected by the user if so desired)), and/or the like.

Figures 2C, 2D:
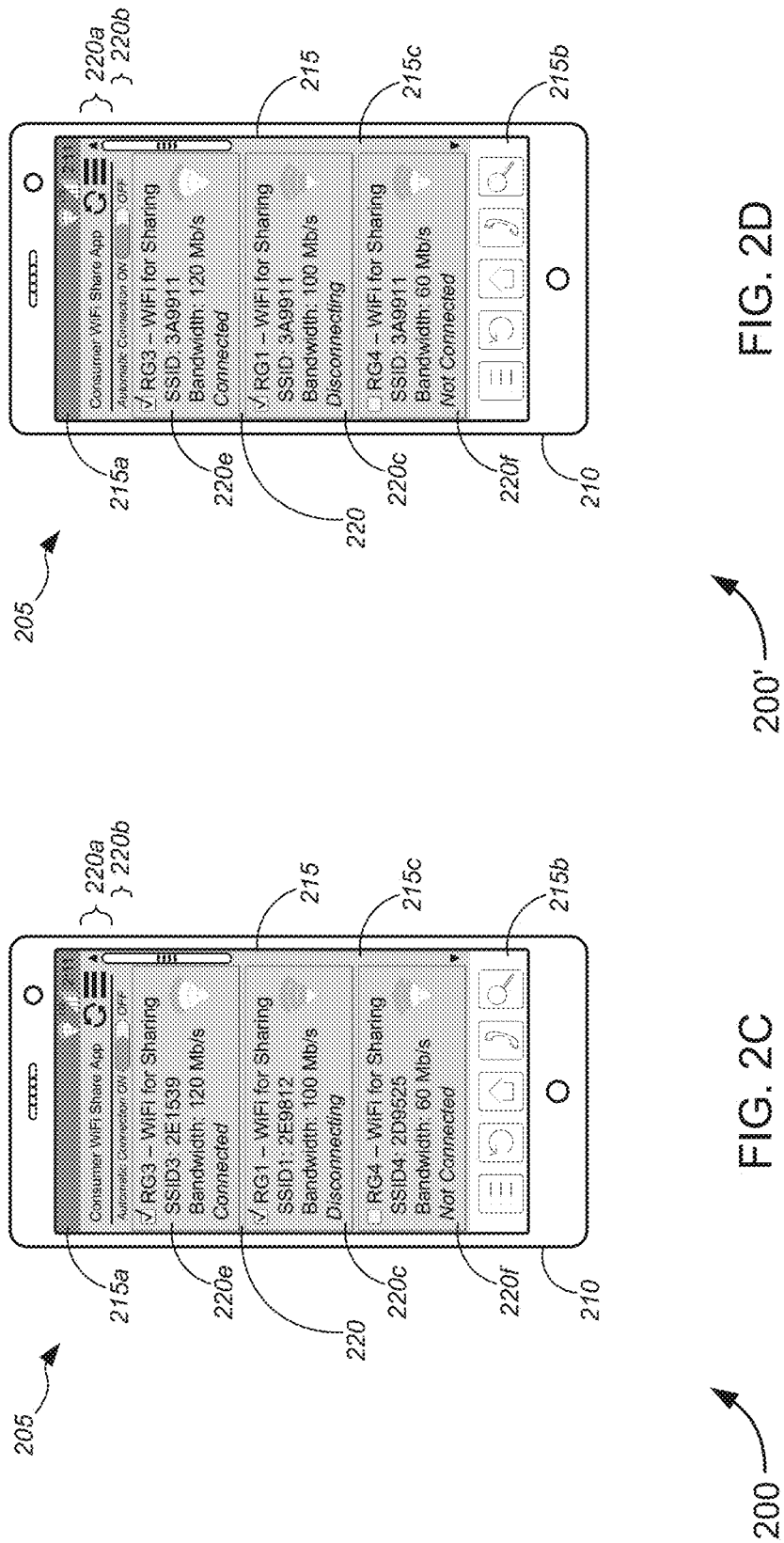

Referring to FIGS. 2C and 2D, rather than unique SSIDs associated with each of the wireless access points 245c, 245a, and 245d as displayed in the information portions 220e, 220c, and 220f, a common or proxy SSID may be established (e.g., by the computing system of FIG. 1, or the like) to replace each of the unique SSIDs as displayed in the information portions 220e, 220c, and 220f. In other words, in response to a scan of available wireless access points, rather than the unique SSIDs being displayed in the information portions 220 associated with the corresponding wireless access points 245 (as shown in FIG. 2C), the common proxy SSID may be displayed in the information portions 220 associated with each of the wireless access points 245 (as shown in the embodiment 200' of FIG. 2D). Further, rather than using the unique SSID of a particular wireless access point 245 to connect the user device 205 with that particular wireless access point 245, the computing system might use the common proxy SSID and might identify the corresponding unique SSID of the particular wireless access point 245 to connect the user device 205 with that particular wireless access point 245, without the unique SSID being visible to the user device. In some cases, network address translation might be used to translate the unique SSIDs with the common proxy SSID, or the like.

Although specific embodiments are shown in FIG. 2, the various embodiments are not limited, and other implementations of consumer WiFi sharing.

FIGS. 3A-3D (collectively, "FIG. 3") are schematic diagrams illustrating various embodiments 300 and 300' of another system that may be used for implementing consumer WiFi sharing. FIG. 3 depicts consumer wireless network sharing in the context of customers of a network service provider designating that at least a portion of their user device wireless network service (e.g., WiFi service, etc.) is available for sharing (and in some cases, also designating an amount of bandwidth that is made available for sharing), via hotspot functionality of the user devices, with users (e.g., subscribers) who are provided with access to the consumer wireless network sharing service.

Figure 3A:
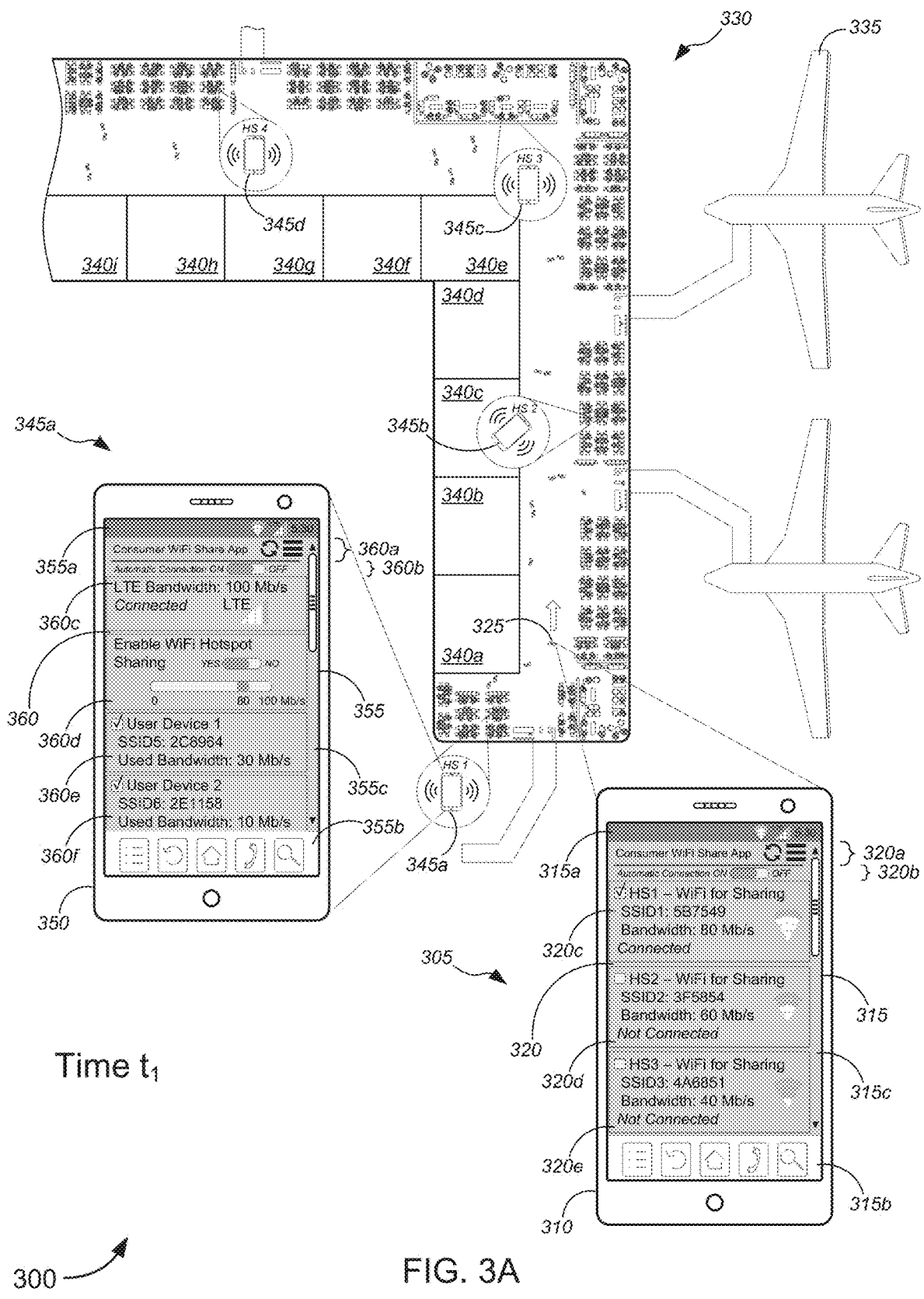
Figure 3B:
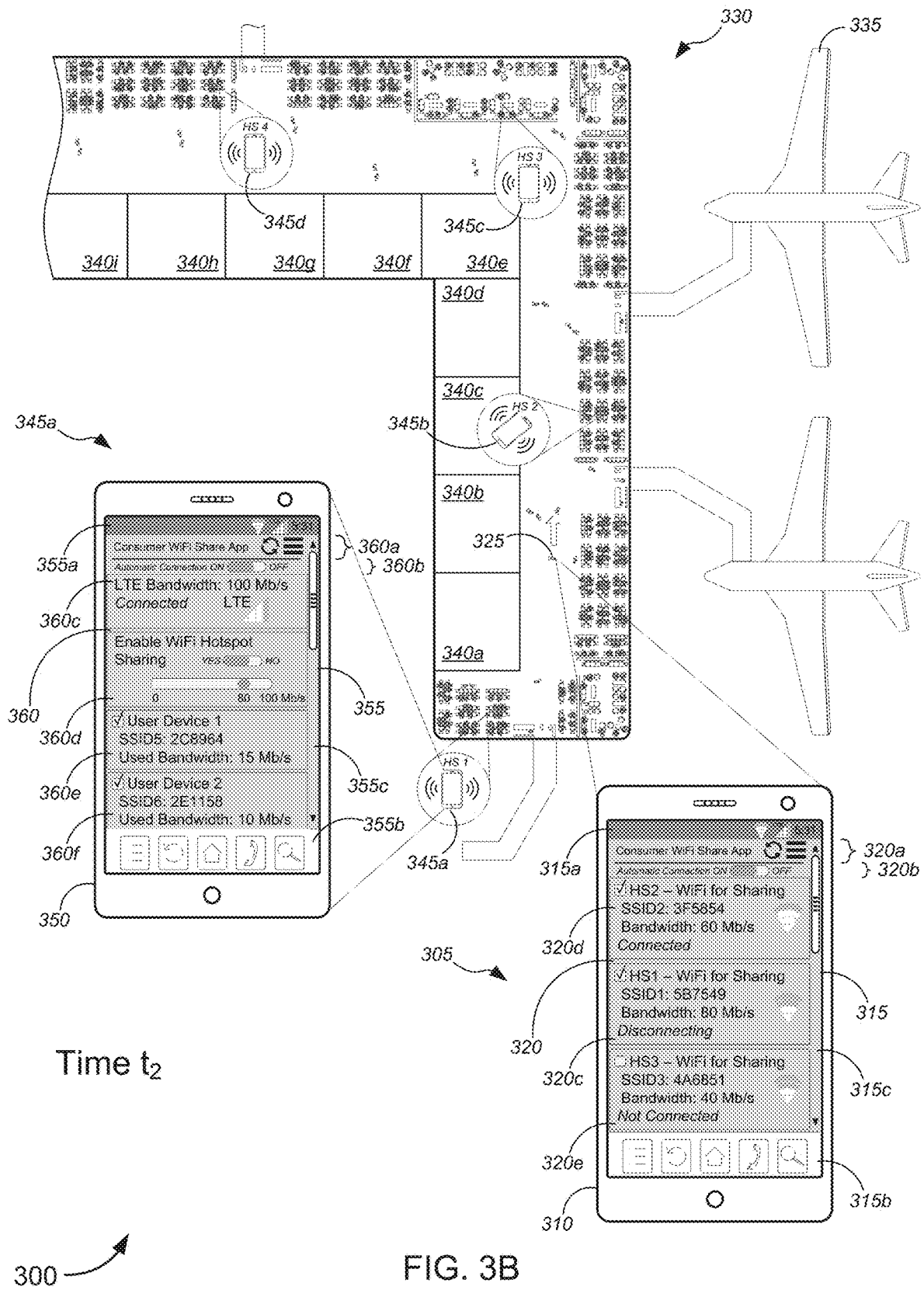

In the non-limiting embodiment 300 of FIG. 3A and FIG. 3B, a user device 305 might comprise a housing 310, a display screen 315, and a consumer WiFi share software application ("app") 320 running on the user device 305 and being displayed on the display screen 315. Alternative to the app 320, a web portal might be implemented. In the non-limiting example of FIG. 3, the display screen 315 might comprise a header portion 315a, a quick task portion 315b, and a main display portion 315c. In the header portion 315a might be displayed at least one of time of day, cellular communications signal strength icon, and/or wireless communications signal strength icon, or the like. In the quick task portion 315b might be displayed at least one of a main menu button, a back or undo button, a home button, a call button, a search button, and/or the like. In the main display portion 315c might be displayed the consumer WiFi share app 320, which might include, but is not limited to, at least one of an app header portion 320a (which might include, without limitation, at least one of an app title, a refresh button, or a menu icon, and/or the like), a connectivity option portion 320b (which might provide the user with the option to turn on or off automatic WiFi connection with available wireless access points or automatic shifting WiFi connection amongst available wireless access points, or the like), or one or more information portions 320c-320e for corresponding one or more wireless access points (or listed hotspots) that are available for sharing, and/or the like. The user device 305 might be carried by a user 325 who might be travelling (e.g., walking, jogging, or running, etc.) along a portion of a building, public area, business area, or open area 330 (in this non-limiting example, an airport terminal, although not limited to such). The airport terminal 330, in this example, might provide travelers with access to airplanes 335, and might comprise a plurality of stores or restaurants 340a-340i, and/or the like. In this example, multiple customers might set up their user devices (e.g., smartphones, tablet computers, or the like) as wireless hotspots ("HS") 345a-345d, the customers being located at various areas of the airport terminal 330, or the like.

As an example, a first hotspot 345a might comprise a housing 350, a display screen 355, and a consumer WiFi share software application ("app") 360 running on the user device or hotspot 345a and being displayed on the display screen 355. In the non-limiting example of FIG. 3, the display screen 355 might comprise a header portion 355a, a quick task portion 355b, and a main display portion 355c. In the header portion 355a might be displayed at least one of time of day, cellular communications signal strength icon, and/or wireless communications signal strength icon, or the like. In the quick task portion 355b might be displayed at least one of a main menu button, a back or undo button, a home button, a call button, a search button, and/or the like. In the main display portion 355c might be displayed the consumer WiFi share app 360, which might include, but is not limited to, at least one of an app header portion 360a (which might include, without limitation, at least one of an app title, a refresh button, or a menu icon, and/or the like), a connectivity option portion 360b (which might provide the user with the option to turn on or off automatic WiFi connection with available wireless access points or automatic shifting WiFi connection amongst available wireless access points, or the like), a bandwidth and connection status portion 360c, a hotspot sharing portion 360d, or one or more information portions 360e-360f for corresponding one or more user devices that are either currently connected with the hotspot 345a (and thus using the shared wireless network service provided by the hotspot 345a or attempting or requesting to connect with the hotspot 345a to access or use the wireless network service provided by the hotspot 345a for sharing), and/or the like. Each of the other hotspots 345b-345d might be similar to the first hotspot 345a in terms of form factor and/or software app configuration, or the like. Each of the wireless hotspots 345a-345d might include, without limitation, one of a portable wireless access point ("WAP") device, a smart phone, a tablet computer, or a portable WiFi hotspot device, and/or the like.

FIGS. 3A and 3B together depict a time lapse (i.e., from time $t_1$ to time $t_2$) in which a user 325 (e.g., a subscriber to the consumer wireless network sharing service) having the user device 305 travels on foot through the building, public area, business area, or open area 330 (in this case, the airport terminal 330) (e.g., as depicted by the arrow in front of the user 325).

At time $t_1$ (as shown in FIG. 3A), the user 325 might be located at a portion of the airport terminal 330 that is closest to the first wireless access point or hotspot HS 1 345a. As depicted in the main display portion 315c of the user device 305 as shown in FIG. 3A, the one or more information portions 320c-320e might include, without limitation, a first information portion 320c, a second information portion 320d, and a third information portion 320e, or the like. The first information portion 320c might include information about the first wireless access point or hotspot HS 1 345a, including, but not limited to, at least one of a first unique service set identifier ("SSID") associated with the first wireless access point or hotspot (in this case, "5B7549"), available bandwidth for sharing by the first wireless access point or hotspot (in this case, "80 Mb/s"), a wireless communications signal strength icon denoting the signal strength of the first wireless access point or hotspot as detected by the user device 305 (in this case, three of four bars of signal), a connection status between the user device 305 and the first wireless access point or hotspot (in this case, the status being "connected"), or a checkbox providing the user with the option of manually connecting or disconnecting the user device 305 from the first wireless access point or hotspot (in this case, since the user device 305 is connected to the first wireless access point or hotspot, the checkbox is filled with a checkmark (which may be manually deselected by the user if so desired)), and/or the like.

The second information portion 320d might include information about the second wireless access point or hotspot HS 2 345b, including, but not limited to, at least one of a second unique SSID associated with the second wireless access point or hotspot (in this case, "3F5854"), available bandwidth for sharing by the second wireless access point or hotspot (in this case, "60 Mb/s"), a wireless communications signal strength icon denoting the signal strength of the second wireless access point or hotspot as detected by the user device 305 (in this case, two of four bars of signal), a connection status between the user device 305 and the second wireless access point or hotspot (in this case, the status being "not connected"), or a checkbox providing the user with the option of manually connecting or disconnecting the user device 305 from the second wireless access point or hotspot (in this case, since the user device 305 is not connected to the second wireless access point or hotspot, the checkbox is not filled with a checkmark (which may be manually selected by the user if so desired)), and/or the like.

The third information portion 320e might include information about the third wireless access point or hotspot HS 3 345c, including, but not limited to, at least one of a third unique SSID associated with the third wireless access point or hotspot (in this case, "4A6851"), available bandwidth for sharing by the third wireless access point or hotspot (in this case, "40 Mb/s"), a wireless communications signal strength icon denoting the signal strength of the third wireless access point or hotspot as detected by the user device 305 (in this case, one of four bars of signal), a connection status between the user device 305 and the third wireless access point or hotspot (in this case, the status being "not connected"), or a checkbox providing the user with the option of manually connecting or disconnecting the user device 305 from the third wireless access point or hotspot (in this case, since the user device 305 is not connected to the third wireless access point or hotspot, the checkbox is not filled with a checkmark (which may be manually selected by the user if so desired)), and/or the like.

As depicted in the main display portion 355c of the user device or hotspot 345a as shown in FIG. 3A, the bandwidth and connection status portion 360c might include, without limitation, at least one of available cellular bandwidth that is available for use by the user device or hotspot 345a (or that may be shared with other devices) (in this case, "100 Mb/s"), a connection status between the user device or hotspot 345a and a cellular wireless access point or hotspot (not shown; in this case, the status being "connected"), or wireless communications signal strength icon (in this case, three of four bars of signal), and/or the like. The hotspot sharing portion 360d, as depicted in the main display portion 355c of the user device or hotspot 345a as shown in FIG. 3A, might include, but is not limited to, at least one of an enable WiFi hotspot sharing option (which might provide the subscriber of the cellular service with the option to enable or disable the WiFi hotspot sharing functionality, or the like), or a bandwidth sharing selector (which might provide the subscriber with the option of selecting an amount of bandwidth to share with other users; in this case, a slide bar that allows the subscriber to share a bandwidth amount between 0 and the available cellular bandwidth (in this case, "80 Mb/s" of "100 Mb/s")), and/or the like.

As shown in FIG. 3A, the one or more information portions 360e-360f might include, without limitation, a first information portion 360e and a second information portion 360f, or the like. The first information portion 360e might include information about a first user device (in this case, user device 305, or the like), including, but not limited to, at least one of a fifth unique SSID associated with the first user device (in this case, "2C8964"), used bandwidth that the first wireless access point or hotspot is sharing with the first user device (in this case, "30 Mb/s"), or a checkbox providing the subscriber with the option of manually connecting or disconnecting the first user device from the first wireless access point or hotspot 345a (in this case, since the first user device is connected to the first wireless access point or hotspot, the checkbox is filled with a checkmark (which may be manually deselected by the subscriber if so desired)), and/or the like.

The second information portion 360f might include information about a second user device (not shown in FIG. 3), including, but not limited to, at least one of a sixth unique SSID associated with the second user device (in this case, "2E1158"), used bandwidth that the first wireless access point or hotspot is sharing with the second user device (in this case, "10 Mb/s"), or a checkbox providing the subscriber with the option of manually connecting or disconnecting the second user device from the first wireless access point or hotspot 345a (in this case, since the second user device is connected to the first wireless access point or hotspot, the checkbox is filled with a checkmark (which may be manually deselected by the subscriber if so desired)), and/or the like.

At time $t_2$ (as shown in FIG. 3B), the user 325 might be located further along at another portion of the airport terminal 330 that is further away from the first wireless access point or hotspot HS 1 345a and closest to the second wireless access point or hotspot HS 2 345b. As depicted in the main display portion 315c of the user device 305 as shown in FIG. 3B, the one or more information portions might include, without limitation, the second information portion 320d, the first information portion 320c, and the third information portion 320e, or the like.

The second information portion 320d might include information about the second wireless access point or hotspot HS 3 345b, including, but not limited to, at least one of the second unique SSID associated with the second wireless access point or hotspot (in this case, "3F5854"), available bandwidth for sharing by the second wireless access point or hotspot (in this case, "60 Mb/s"), the wireless communications signal strength icon denoting the signal strength of the second wireless access point or hotspot as detected by the user device 305 (in this case, three of four bars of signal), a connection status between the user device 305 and the second wireless access point or hotspot (in this case, the status being "connected"), or the checkbox providing the user with the option of manually connecting or disconnecting the user device 305 from the second wireless access point or hotspot (in this case, since the user device 305 is automatically connected to the second wireless access point or hotspot (as a result of the automatic connection selector being set to ON by the user, and the computing system (shown in FIG. 1) automatically establishing a connection between the user device 305 and the second wireless access point or hotspot 345b via the consumer WiFi Share App or the like)), and/or the like. In this case, the checkbox is filled with a checkmark (which may be manually deselected by the user if so desired).

The first information portion 320c might include information about the first wireless access point or hotspot HS 1 345a, including, but not limited to, at least one of the first SSID associated with the first wireless access point or hotspot (in this case, "5B7549"), available bandwidth for sharing by the first wireless access point or hotspot (in this case, "80 Mb/s"), the wireless communications signal strength icon denoting the signal strength of the first wireless access point or hotspot as detected by the user device 305 (in this case, two of four bars of signal), the connection status between the user device 305 and the first wireless access point or hotspot (in this case, the status being "disconnecting"; in this case, after connecting the user device 305 with the second wireless access point or hotspot, the computing system (as shown in FIG. 1) might begin to disconnect the user device 305 from the first wireless access point or hotspot), or the checkbox providing the user with the option of manually connecting or disconnecting the user device 305 from the first wireless access point or hotspot (in this case, since the user device 305 is still connected to the first wireless access point or hotspot, the checkbox is filled with a checkmark (which may be manually deselected by the user if so desired)), and/or the like.

The third information portion 320e might include information about the third wireless access point or hotspot HS 3 345c, including, but not limited to, at least one of the third unique SSID associated with the third wireless access point or hotspot (in this case, "4A6851"), available bandwidth for sharing by the third wireless access point or hotspot (in this case, "40 Mb/s"), the wireless communications signal strength icon denoting the signal strength of the third wireless access point or hotspot as detected by the user device 305 (in this case, two of four bars of signal), the connection status between the user device 305 and the third wireless access point or hotspot (in this case, the status being "not connected"), or the checkbox providing the user with the option of manually connecting or disconnecting the user device 305 from the third wireless access point or hotspot (in this case, since the user device 305 is not connected to the third wireless access point or hotspot, the checkbox is not filled with a checkmark (which may be manually selected by the user if so desired)), and/or the like.

Also at time $t_2$ (as shown in FIG. 3B), the first information portion 360e might have a used bandwidth that the first wireless access point or hotspot is sharing with the first user device that changes from that at time $t_1$ (in this case, changed from "30 Mb/s" to "15 Mb/s" perhaps as a result of the first user device having been moved further away from the first wireless access point or hotspot), and/or the like.

Referring to FIGS. 3C and 3D, rather than unique SSIDs associated with each of the wireless access points or hotspots 345b, 345a, and 345c as displayed in the information portions 320d, 320c, and 320e, a common or proxy SSID may be established (e.g., by the computing system of FIG. 1, or the like) to replace each of the unique SSIDs as displayed in the information portions 320d, 320c, and 320e. In other words, in response to a scan of available wireless access points or hotspots, rather than the unique SSIDs being displayed in the information portions 320 associated with the corresponding wireless access points or hotspots 345 (as shown in FIG. 3C), the common proxy SSID may be displayed in the information portions 320 associated with each of the wireless access points or hotspots 345 (as shown in the embodiment 300' of FIG. 3D). Further, rather than using the unique SSID of a particular wireless access point or hotspot 345 to connect the user device 305 with that particular wireless access point or hotspot 345, the computing system might use the common proxy SSID and might identify the corresponding unique SSID of the particular wireless access point or hotspot 345 to connect the user device 305 with that particular wireless access point or hotspot 345, without the unique SSID being visible to the user device. In some cases, network address translation might be used to translate the unique SSIDs with the common proxy SSID, or the like.

Although specific embodiments are shown in FIG. 3, the various embodiments are not limited, and other implementations of consumer WiFi sharing.

Also, although FIG. 2 depicts consumer WiFi sharing using stationary wireless access points (in this case, RGs, or the like), while FIG. 3 depicts consumer WiFi sharing using portable wireless access points (in this case, hotspots, or the like), the various embodiments are not so limited and consumer WiFi sharing may be implemented using any combination of stationary wireless access points (including, but not limited to, one or more of RGs, BGs, vGs, NAPs, or WAP devices, and/or the like) and portable wireless access points (including, without limitation, one or more of portable WAP devices, smart phones, tablet computers, or portable WiFi hotspot devices, and/or the like), although not shown in FIGS. 2 and 3.

FIGS. 4A-4D (collectively, "FIG. 4") are flow diagrams illustrating a method 400 for implementing consumer WiFi sharing, in accordance with various embodiments. Method 400 of FIG. 4A continues onto FIG. 4B following the circular marker denoted, "A," and/or continues onto FIG. 4D following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems or embodiments 100, 200, 200', 300, and 300' of FIGS. 1, 2A-2C, 2D, 3A-3C, and 3D, respectively (or components thereof), such methods may also be implemented using any suitable hardware (or software) implementation. Similarly, while each of the systems or embodiments 100, 200, 200', 300, and 300' of FIGS. 1, 2A-2C, 2D, 3A-3C, and 3D, respectively (or components thereof), can operate according to the method 400 illustrated by FIG. 4 (e.g., by executing instructions embodied on a computer readable medium), the systems or embodiments 100, 200, 200', 300, and 300' of FIGS. 1, 2A-2C, 2D, 3A-3C, and 3D can each also operate according to other modes of operation and/or perform other suitable procedures.

Figure 4A:
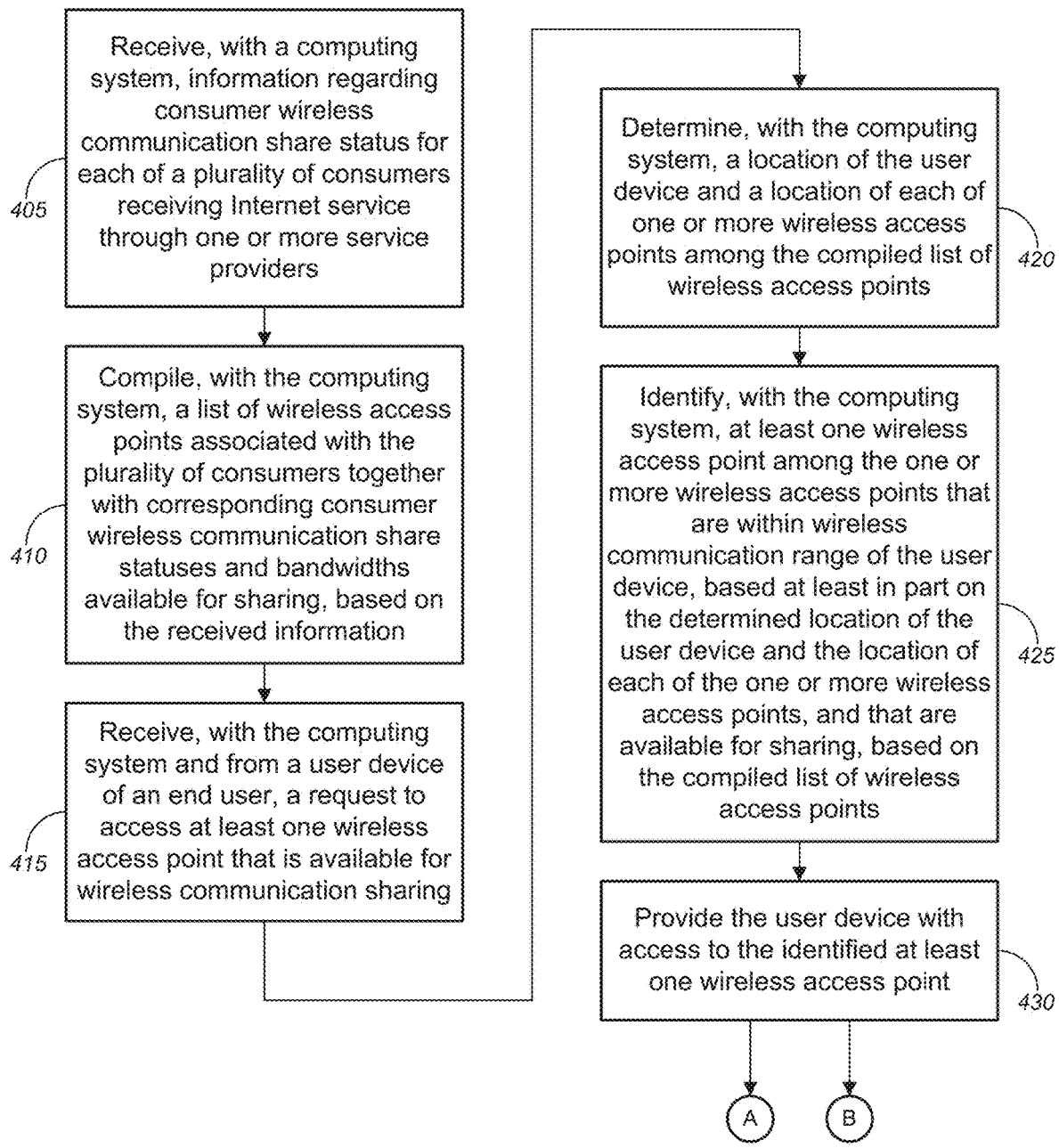

In the non-limiting embodiment of FIG. 4A, method 400, at block 405, might comprise receiving, with a computing system, information regarding consumer wireless communication share status for each of a plurality of consumers receiving Internet service through one or more service providers. At block 410, method 400 might comprise compiling, with the computing system, a list of wireless access points associated with the plurality of consumers together with corresponding consumer wireless communication share statuses and bandwidths available for sharing, based on the received information.

Method 400 might further comprise receiving, with the computing system and from a user device of an end user, a request to access at least one wireless access point that is available for wireless communication sharing (block 415) and determining, with the computing system, a location of the user device and a location of each of one or more wireless access points among the compiled list of wireless access points (block 420). Method 400 might further comprise, at block 425, identifying, with the computing system, at least one wireless access point among the one or more wireless access points that are within wireless communication range of the user device, based at least in part on the determined location of the user device and the location of each of the one or more wireless access points, and that are available for sharing, based on the compiled list of wireless access points. At block 430, method 400 might comprise providing the user device with access to the identified at least one wireless access point.

In some embodiments, the identified at least one wireless access point might each include, without limitation, one of a residential gateway device, a business gateway device, a virtual gateway device, a network access point ("NAP"), a wireless access point ("WAP") device, a smart phone, a tablet computer, or a portable WiFi hotspot device, and/or the like. According to some embodiments, the user device might include, but is not limited to, one of a laptop computer, a tablet computer, a handheld computer, a smart phone, a mobile telephone, a personal digital assistant, a smart watch, or a portable gaming device, and/or the like.

Figure 4D:
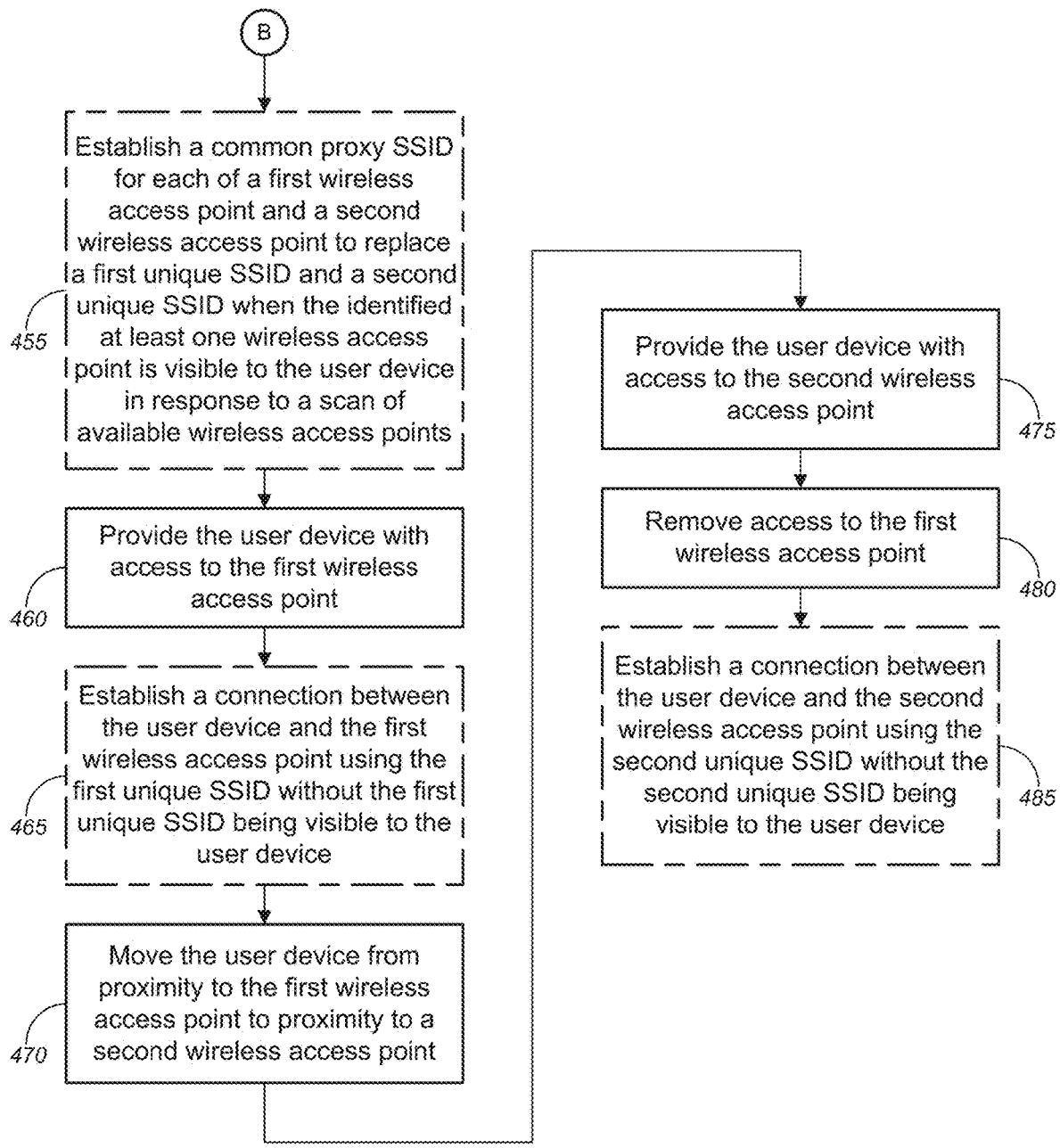

In some embodiments, method 400 might continue from block 430 onto the process at block 435 in FIG. 4B following the circular marker denoted, "A." Alternatively, method 400 might continue from block 430 onto the process at optional block 455 in FIG. 4D following the circular marker denoted, "B."

With reference to FIG. 4B (following the circular marker denoted, "A"), method 400 might comprise tracking, with the computing system, network usage by the user device via each of the identified at least one wireless access point (block 435); billing, with the computing system, the end user for total network usage via all of the identified at least one wireless access point based at least in part on the tracked network usage (block 440); and sending payment to each consumer associated with each of the identified at least one wireless access point based at least in part on the tracked network usage by the user device via each of the identified at least one wireless access point (block 445). In some cases, billing the end user might comprise charging the end user at rates that are based on location and density of available wireless communication coverage.

Referring to FIG. 4C, providing the user device with access to the identified at least one wireless access point (at block 430) might comprise establishing, with the computing system, a virtual private network ("VPN") between the user device and at least one network node providing the Internet service via the identified at least one wireless access point (block 450). According to some embodiments, a walled garden or the like might be used to limit access to the wireless network communication by the user devices, in terms of content, websites, usage time, etc.

At optional block 455 in FIG. 4D (following the circular marker denoted, "B"), method 400 might comprise establishing a common proxy SSID for each of a first wireless access point and a second wireless access point to replace a first unique SSID and a second unique SSID when the identified at least one wireless access point is visible to the user device in response to a scan of available wireless access points. Method 400 might further comprise providing the user device with access to the first wireless access point (block 460), and in some cases, establishing a connection between the user device and the first wireless access point using the first unique SSID without the first unique SSID being visible to the user device (optional block 465).

At block 470, method 400 might comprise moving the user device from proximity to the first wireless access point to proximity to a second wireless access point. Method 400 might further comprise providing the user device with access to the second wireless access point (block 475), removing access to the first wireless access point (block 480), and in some cases, establishing a connection between the user device and the second wireless access point using the second unique SSID without the second unique SSID being visible to the user device (optional block 485).

According to some embodiments, each of at least one of the first wireless access point or second wireless access point might be a stationary wireless access point. Alternatively, each of at least one of the first wireless access point or second wireless access point might be a cellular WiFi hotspot device. Alternatively, one of the first wireless access point or the second wireless access point might be a stationary wireless access point while the other of the first wireless access point or the second wireless access point might be a cellular WiFi hotspot device.

Exemplary System and Hardware Implementation

Figure 5:
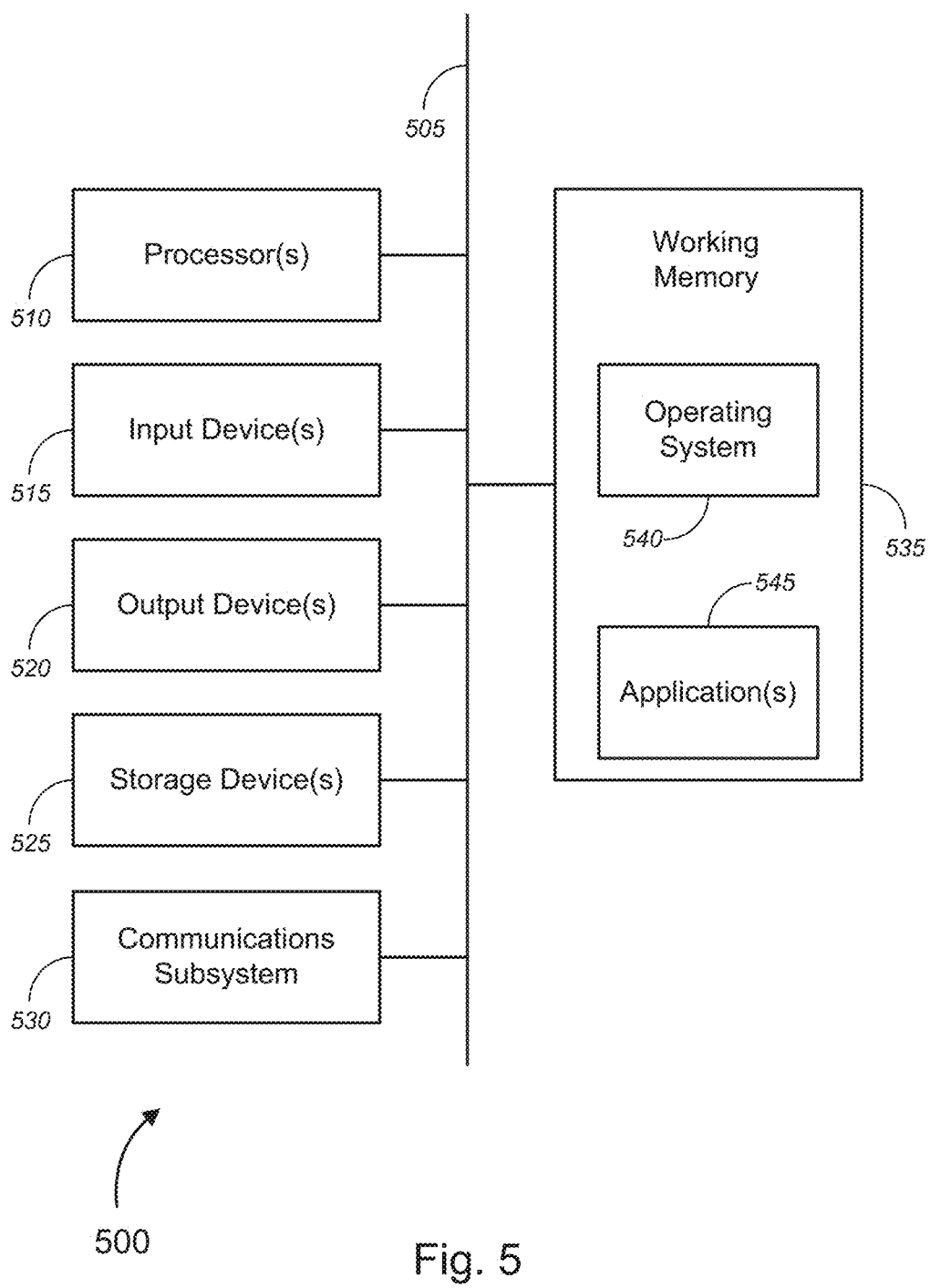
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105, cloud server 110, network access server 125, residential gateway ("RG") devices 130 and 245a-245d, user devices 140a-140n, 155a-155n, 205, and 305, and hotspot devices 150 and 345a-345d, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105, cloud server 110, network access server 125, RG device 130 and 245a-245d, user devices 140a-140n, 155a-155n, 205, and 305, and hotspot devices 150 and 345a-345d, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
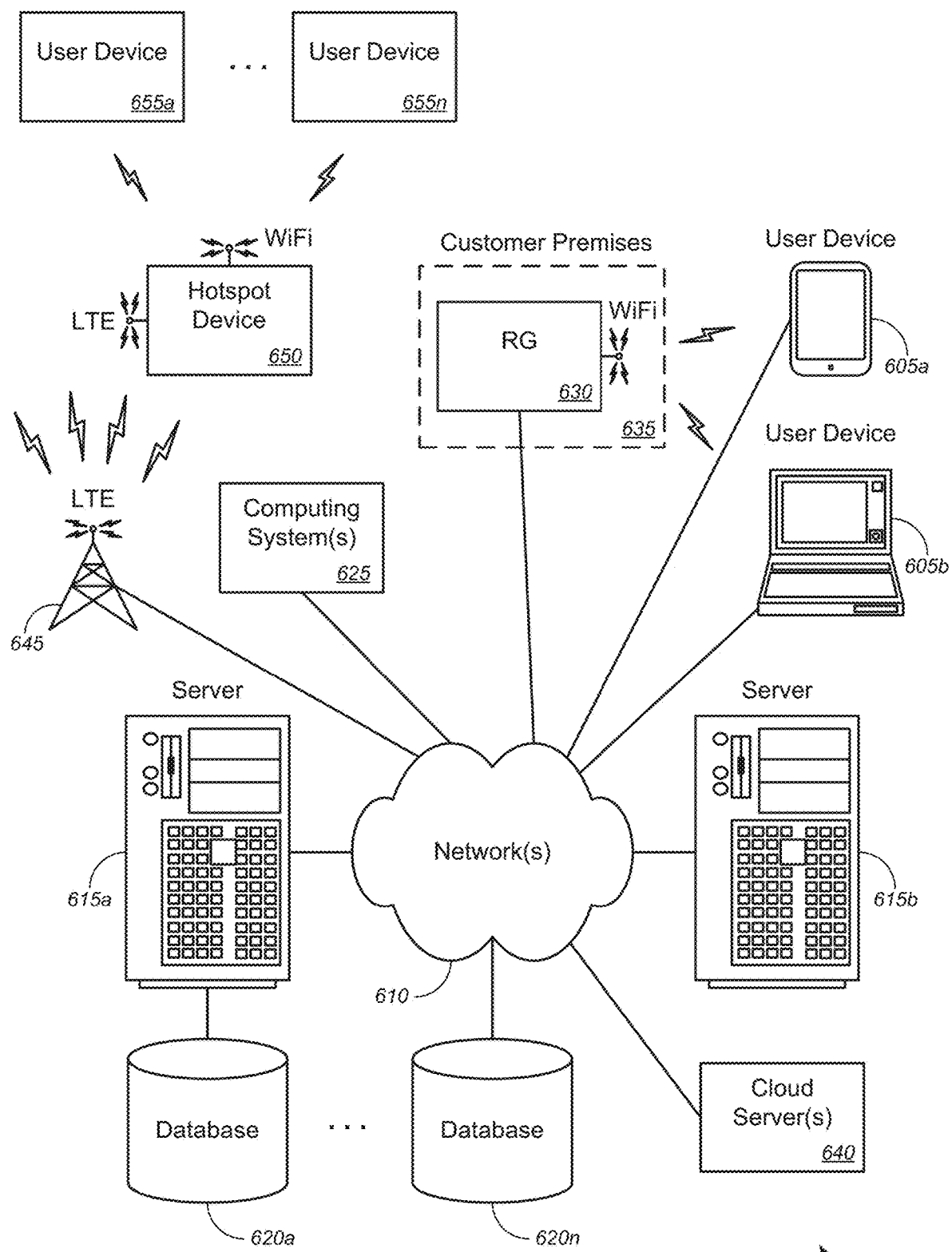
FIG. 6 is a block diagram illustrating a networked system of computers, computing systems, or system hardware architecture, which can be used in accordance with various embodiments.

As noted above, a set of embodiments comprises methods and systems for implementing wireless communications, and, more particularly, to methods, systems, and apparatuses for implementing consumer WiFi sharing. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to networks 115 and 120 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing wireless communications, and, more particularly, to methods, systems, and apparatuses for implementing consumer WiFi sharing, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* might reside on a storage medium local to (and/or resident in) a server 615*a* (and/or a user computer, user device, or customer device 605). Alternatively, a database 620*n* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise one or more computing systems 625 (similar to computing systems 105 of FIG. 1, or the like) and a residential gateway ("RG") device 630 (similar to RG devices 130 and 245*a*-245*d* of FIGS. 1 and 2, or the like), which may be located within customer premises 635 (similar to customer premises 135 of FIG. 1, or the like). System 600 might further comprise cloud server(s) 640 (similar to cloud server(s) 110 of FIG. 1, or the like). System 600 might also comprise one or more telecommunications relay systems 645 (similar to telecommunications relay systems 145 of FIG. 1, or the like), a hotspot device 650 (similar to hotspot devices 150 and 345*a*-345*d* of FIGS. 1 and 3, or the like), and one or more user devices 655*a*-655*n* (similar to user devices 155*a*-155*n* and 305 of FIGS. 1 and 3, or the like).

In operation, the computing system 625 or the cloud server(s) 640 might receive information regarding consumer wireless communication share status for each of a plurality of consumers receiving Internet service through one or more service providers; might compile a list of wireless access points 630 and/or 650 associated with the plurality of consumers together with corresponding consumer wireless communication share statuses and bandwidths available for sharing, based on the received information; might receive, from a user device 605 or 655 of an end user, a request to access at least one wireless access point 630 or 650 that is available for wireless communication sharing; might determine a location of the user device 605 or 655 and a location of each of one or more wireless access points 630 or 650 among the compiled list of wireless access points 630 and/or 650; might identify at least one wireless access point 630 or 650 among the one or more wireless access points 630 and/or 650 that are within wireless communication range of the user device 605 or 655, based at least in part on the determined location of the user device 605 or 655 and the location of each of the one or more wireless access points 630 or 650, and that are available for sharing, based on the compiled list of wireless access points 630 and/or 650; and might provide the user device 605 or 655 with access to the identified at least one wireless access point 630 or 650.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system, information regarding consumer wireless communication share status for each of a plurality of consumers receiving Internet service through one or more service providers;
   compiling, with the computing system, a list of wireless access points associated with the plurality of consumers together with corresponding consumer wireless communication share statuses and bandwidths available for sharing, based on the received information;
   receiving, with the computing system and from a user device of an end user, a request to access at least one wireless access point that is available for wireless communication sharing;
   determining, with the computing system, a location of the user device and a location of each of one or more wireless access points among the compiled list of wireless access points;
   identifying, with the computing system, at least one wireless access point among the one or more wireless access points that are within wireless communication range of the user device, based at least in part on the determined location of the user device and the location of each of the one or more wireless access points, and that are available for sharing, based on the compiled list of wireless access points; and
   providing the user device with access to the identified at least one wireless access point.

2. The method of claim 1, wherein the identified at least one wireless access point each comprises one of a residential gateway device, a business gateway device, a virtual gateway device, a network access point ("NAP"), a wireless access point ("WAP") device, a smart phone, a tablet computer, or a portable WiFi hotspot device.

3. The method of claim 1, wherein the user device comprises one of a laptop computer, a tablet computer, a handheld computer, a smart phone, a mobile telephone, a personal digital assistant, a smart watch, or a portable gaming device.

4. The method of claim 1, further comprising:
   tracking, with the computing system, network usage by the user device via each of the identified at least one wireless access point.

5. The method of claim 4, further comprising:
   billing, with the computing system, the end user for total network usage via all of the identified at least one wireless access point based at least in part on the tracked network usage; and
   sending payment to each consumer associated with each of the identified at least one wireless access point based at least in part on the tracked network usage by the user device via each of the identified at least one wireless access point.

6. The method of claim 5, wherein billing the end user comprises charging the end user at rates that are based on location and density of available wireless communication coverage.

7. The method of claim 1, wherein the user device is moved relative to the location of each of the identified at least one wireless access point from proximity to a first wireless access point among the identified at least one wireless access point to proximity to a second wireless access point among the identified at least one wireless access point, wherein providing the user device with access to the identified at least one wireless access point comprises providing the user device with access to the first wireless access point; and while the user device is moved closer to the second wireless access point, providing the user device with access to the second wireless access point while removing access to the first wireless access point.

8. The method of claim 7, wherein each of at least one of the first wireless access point or second wireless access point is a stationary wireless access point.

9. The method of claim 7, wherein each of at least one of the first wireless access point or second wireless access point is a cellular WiFi hotspot device.

10. The method of claim 7, wherein the first wireless access point comprises a corresponding first unique service set identifier ("SSID"), wherein the second wireless access point comprises a corresponding second unique SSID, wherein the method further comprises:
    establishing a common proxy SSID for each of the first wireless access point and the second wireless access point to replace the first unique SSID and the second unique SSID when the identified at least one wireless access point is visible to the user device in response to a scan of available wireless access points;
    wherein providing the user device with access to the first wireless access point comprises establishing a connection between the user device and the first wireless access point using the first unique SSID without the first unique SSID being visible to the user device; and
    wherein providing the user device with access to the second wireless access point comprises establishing a connection between the user device and the second wireless access point using the second unique SSID without the second unique SSID being visible to the user device.

11. The method of claim 1, wherein providing the user device with access to the identified at least one wireless access point comprises establishing, with the computing system, a virtual private network ("VPN") between the user device and at least one network node providing the Internet service via the identified at least one wireless access point.

12. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive information regarding consumer wireless communication share status for each of a plurality of consumers receiving Internet service through one or more service providers;
compile a list of wireless access points associated with the plurality of consumers together with corresponding consumer wireless communication share statuses and bandwidths available for sharing, based on the received information;
receive, from a user device of an end user, a request to access at least one wireless access point that is available for wireless communication sharing;
determine a location of the user device and a location of each of one or more wireless access points among the compiled list of wireless access points;
identify at least one wireless access point among the one or more wireless access points that are within wireless communication range of the user device, based at least in part on the determined location of the user device and the location of each of the one or more wireless access points, and that are available for sharing, based on the compiled list of wireless access points; and
provide the user device with access to the identified at least one wireless access point.

13. The apparatus of claim 12, wherein the identified at least one wireless access point each comprises one of a residential gateway device, a business gateway device, a virtual gateway device, a network access point ("NAP"), a wireless access point ("WAP") device, a smart phone, a tablet computer, or a portable WiFi hotspot device.

14. The apparatus of claim 12, wherein the user device comprises one of a laptop computer, a tablet computer, a handheld computer, a smart phone, a mobile telephone, a personal digital assistant, a smart watch, or a portable gaming device.

15. The apparatus of claim 12, wherein the set of instructions, when executed by the at least one processor, further causes the apparatus to:
track network usage by the user device via each of the identified at least one wireless access point.

16. The apparatus of claim 15, wherein the set of instructions, when executed by the at least one processor, further causes the apparatus to:
bill the end user for total network usage via all of the identified at least one wireless access point based at least in part on the tracked network usage; and
send payment to each consumer associated with each of the identified at least one wireless access point based at least in part on the tracked network usage by the user device via each of the identified at least one wireless access point.

17. The apparatus of claim 12, wherein the user device is moved relative to the location of each of the identified at least one wireless access point from proximity to a first wireless access point among the identified at least one wireless access point to proximity to a second wireless access point among the identified at least one wireless access point, wherein providing the user device with access to the identified at least one wireless access point comprises providing the user device with access to the first wireless access point; and while the user device is moved closer to the second wireless access point, providing the user device with access to the second wireless access point while removing access to the first wireless access point.

18. The apparatus of claim 12, wherein the first wireless access point comprises a corresponding first unique service set identifier ("SSID"), wherein the second wireless access point comprises a corresponding second unique SSID, wherein the set of instructions, when executed by the at least one processor, further causes the apparatus to:
establish a common proxy SSID for each of the first wireless access point and the second wireless access point to replace the first unique SSID and the second unique SSID when the identified at least one wireless access point is visible to the user device in response to a scan of available wireless access points;
wherein providing the user device with access to the first wireless access point comprises establishing a connection between the user device and the first wireless access point using the first unique SSID without the first unique SSID being visible to the user device; and
wherein providing the user device with access to the second wireless access point comprises establishing a connection between the user device and the second wireless access point using the second unique SSID without the second unique SSID being visible to the user device.

19. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive information regarding consumer wireless communication share status for each of a plurality of consumers receiving Internet service through one or more service providers;
compile a list of wireless access points associated with the plurality of consumers together with corresponding consumer wireless communication share statuses and bandwidths available for sharing, based on the received information;
receive, from a user device of an end user, a request to access at least one wireless access point that is available for wireless communication sharing;
determine a location of the user device and a location of each of one or more wireless access points among the compiled list of wireless access points;
identify at least one wireless access point among the one or more wireless access points that are within wireless communication range of the user device, based at least in part on the determined location of the user device and the location of each of the one or more wireless access points, and that are available for sharing, based on the compiled list of wireless access points; and provide the user device with access to the identified at least one wireless access point.

* * * * *